United States Patent [19]
Conary et al.

[11] Patent Number: 5,481,731
[45] Date of Patent: Jan. 2, 1996

[54] METHOD AND APPARATUS FOR INVALIDATING A CACHE WHILE IN A LOW POWER STATE

[75] Inventors: James W. Conary, Aloha; Robert R. Beutler, Lake Oswego, both of Oreg.

[73] Assignee: Intel Corporation, Santa Clara, Calif.

[21] Appl. No.: 36,470

[22] Filed: Mar. 24, 1993

Related U.S. Application Data

[63] Continuation-in-part of Ser. No. 778,575, Oct. 17, 1991, abandoned.

[51] Int. Cl.$^6$ ........................................... G06F 1/32
[52] U.S. Cl. ..................... 395/750; 364/243.41; 395/468
[58] Field of Search ..................... 395/750, 775, 395/575; 331/1; 364/200

[56] References Cited

U.S. PATENT DOCUMENTS

| | | |
|---|---|---|
| 3,623,017 | 11/1971 | Lowell . |
| 3,715,729 | 2/1973 | Mercy . |
| 3,895,311 | 7/1975 | Basse et al. . |
| 3,919,695 | 11/1975 | Gooding . |
| 3,931,585 | 1/1976 | Barker et al. . |
| 3,936,762 | 2/1976 | Cox, Jr. et al. . |
| 4,077,016 | 2/1978 | Sanders et al. . |
| 4,095,267 | 6/1978 | Morimoto . |
| 4,203,153 | 5/1980 | Boyd . |
| 4,264,863 | 4/1981 | Kojima . |
| 4,293,927 | 10/1981 | Hoshii . |
| 4,300,019 | 11/1981 | Toyomaki . |
| 4,365,290 | 12/1982 | Nelms et al. . |
| 4,385,351 | 5/1983 | Matsuura et al. ........... 364/200 |
| 4,405,898 | 9/1983 | Flemming . |
| 4,479,191 | 10/1984 | Nojima et al. . |
| 4,506,323 | 3/1985 | Pusic et al. ................. 395/750 |
| 4,615,005 | 9/1986 | Maejima et al. . |
| 4,639,864 | 1/1987 | Katzman et al. . |
| 4,667,289 | 5/1987 | Yoshida et al. . |
| 4,669,099 | 5/1987 | Zinn . |
| 4,698,748 | 10/1987 | Juzswik et al. . |
| 4,747,043 | 5/1988 | Rodman ...................... 364/200 |
| 4,758,945 | 7/1988 | Remedi . |

(List continued on next page.)

FOREIGN PATENT DOCUMENTS

| | | |
|---|---|---|
| 103755A2 | 3/1984 | European Pat. Off. . |
| 0140814A3 | 5/1985 | European Pat. Off. . |
| 0242010 | 12/1987 | European Pat. Off. . |
| 0368144A2 | 5/1990 | European Pat. Off. . |
| 0366250A1 | 5/1990 | European Pat. Off. . |
| 0419908A2 | 4/1991 | European Pat. Off. . |
| 0451661A3 | 10/1991 | European Pat. Off. . |
| 0451661A2 | 10/1991 | European Pat. Off. . |
| 0478132A1 | 4/1992 | European Pat. Off. . |
| 2010551 | 6/1979 | United Kingdom . |
| 2130765 | 6/1984 | United Kingdom . |

OTHER PUBLICATIONS

Case, Brian. "R4000 Extends R3000 Architecture", *Microprocessor Report*, vol. v5n19, Oct. 16, 1991.
Slater, Michael. "MIPS Previews 64–Bit R4000 Architecture", *Microprocessor Report*, vol. v522, Feb. 6, 1991, p. p1(6).
Wilson, John. "MIPS Rethinks RICS with Superpipelining", *Computer Design*, vol. v30n3, Feb. 1, 1991, p. p28(3).
Intel Automotive Components Handbook "Power–On Reset", 1988, pp. 10–24 & 10–25.
Motorola MC6802032—Bit Microprocessor User's Manual, 3rd Edition, 1990, pp. 1–3.

*Primary Examiner*—Jack B. Harvey
*Assistant Examiner*—David A. Wiley
*Attorney, Agent, or Firm*—Blakely, Sokoloff, Taylor, Zafman

[57] ABSTRACT

A method and apparatus for allowing a processor to invalidate an individual line of its internal cache while in a non-clocked low power state. The present invention includes circuitry for placing the processor in a reduced power consumption state. The present invention also includes circuitry for powering up the processor out of the reduced power consumption state to invalidate data in the cache in order to maintain cache coherency while in the reduced power consumption state.

24 Claims, 9 Drawing Sheets

U.S. PATENT DOCUMENTS

| | | |
|---|---|---|
| 4,766,567 | 8/1988 | Kato . |
| 4,780,843 | 10/1988 | Tietjen . |
| 4,814,591 | 3/1989 | Nara et al. . |
| 4,823,256 | 4/1989 | Bishop et al. ............................ 395/575 |
| 4,823,292 | 4/1989 | Hillion . |
| 4,841,440 | 6/1989 | Yonezu et al. . |
| 4,881,205 | 11/1989 | Aihara . |
| 4,896,260 | 1/1990 | Hyatt . |
| 4,907,183 | 3/1990 | Tanaka . |
| 4,922,450 | 5/1990 | Rose et al. . |
| 4,931,748 | 6/1990 | McDermott et al. ..................... 331/1 |
| 4,935,863 | 6/1990 | Calvas et al. . |
| 4,979,097 | 12/1990 | Triolo et al. . |
| 4,980,836 | 12/1990 | Carter et al. . |
| 4,991,129 | 2/1991 | Swartz . |
| 5,021,679 | 6/1991 | Fairbanks et al. . |
| 5,025,387 | 6/1991 | Frane . |
| 5,059,924 | 10/1991 | JenningsCheck . |
| 5,077,686 | 12/1991 | Rubenstein . |
| 5,083,266 | 1/1992 | Watanabe . |
| 5,103,114 | 4/1992 | Fitch . |
| 5,123,107 | 6/1992 | Mensch, Jr. . |
| 5,129,091 | 7/1992 | Yorimoto et al. . |
| 5,133,064 | 7/1992 | Hotta et al. . |
| 5,151,992 | 9/1992 | Nagae . |
| 5,167,024 | 11/1992 | Smith et al. . |
| 5,175,845 | 12/1992 | Little . |
| 5,220,672 | 6/1993 | Nakao et al. . |
| 5,239,652 | 8/1993 | Seibert et al. . |
| 5,249,298 | 9/1993 | Bolan et al. . |
| 5,251,320 | 10/1993 | Kuzawinski et al. . |
| 5,289,581 | 2/1994 | Berengwal et al. ..................... 395/275 |
| 5,319,771 | 6/1994 | Takeda . |
| 5,336,939 | 8/1994 | Eitrheim et al. . |
| 5,359,232 | 10/1994 | Eitrheim et al. . |

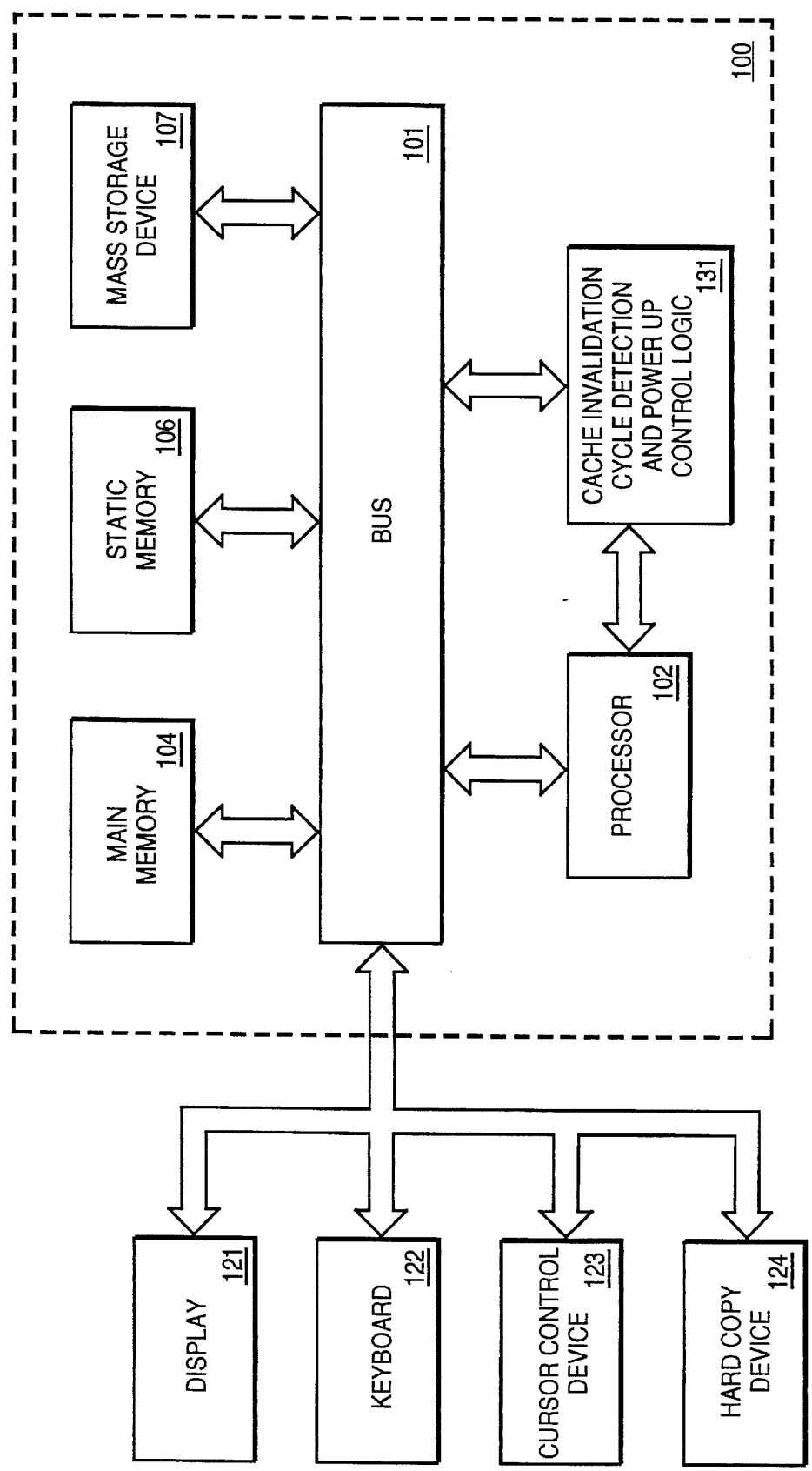

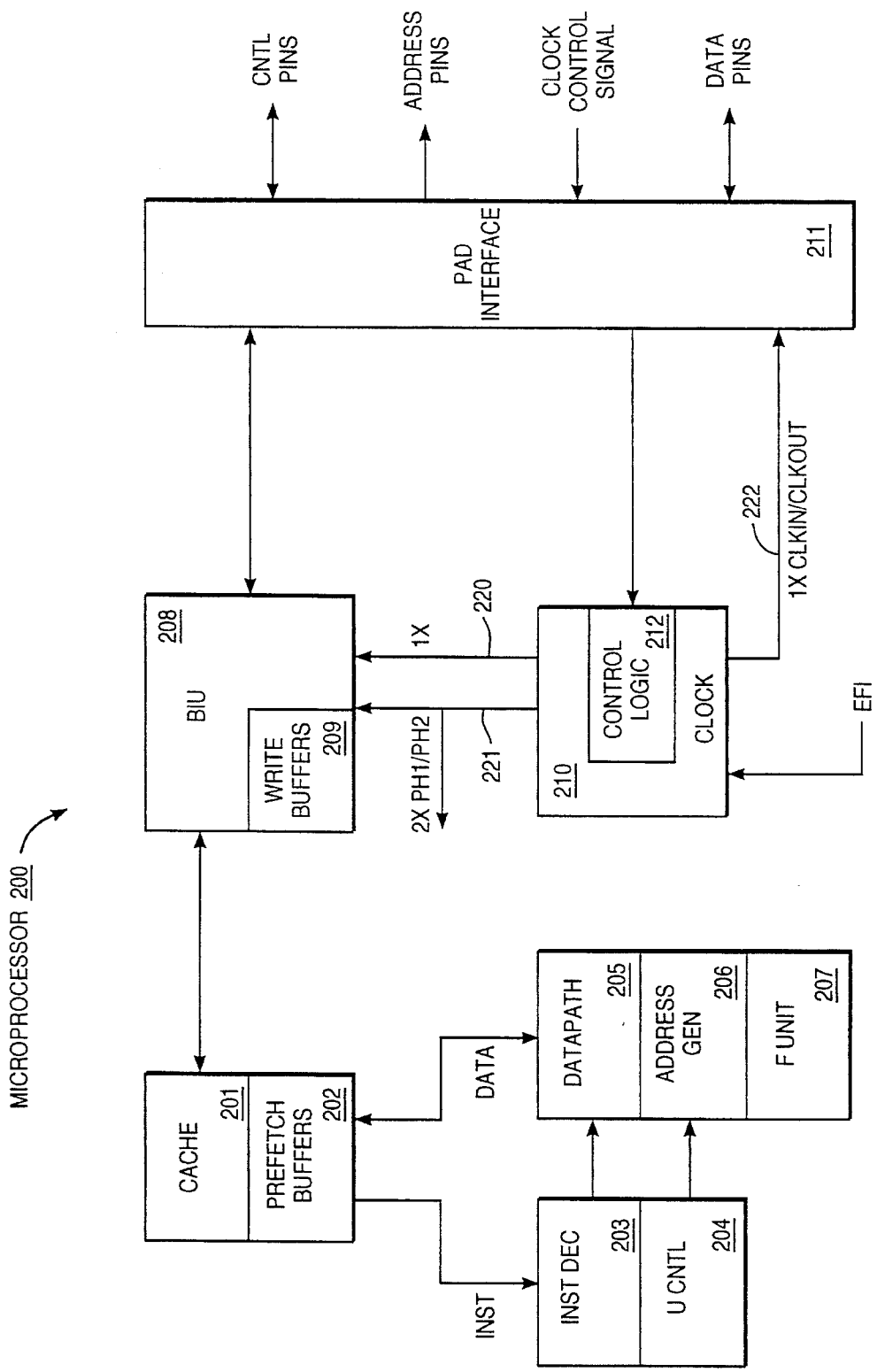

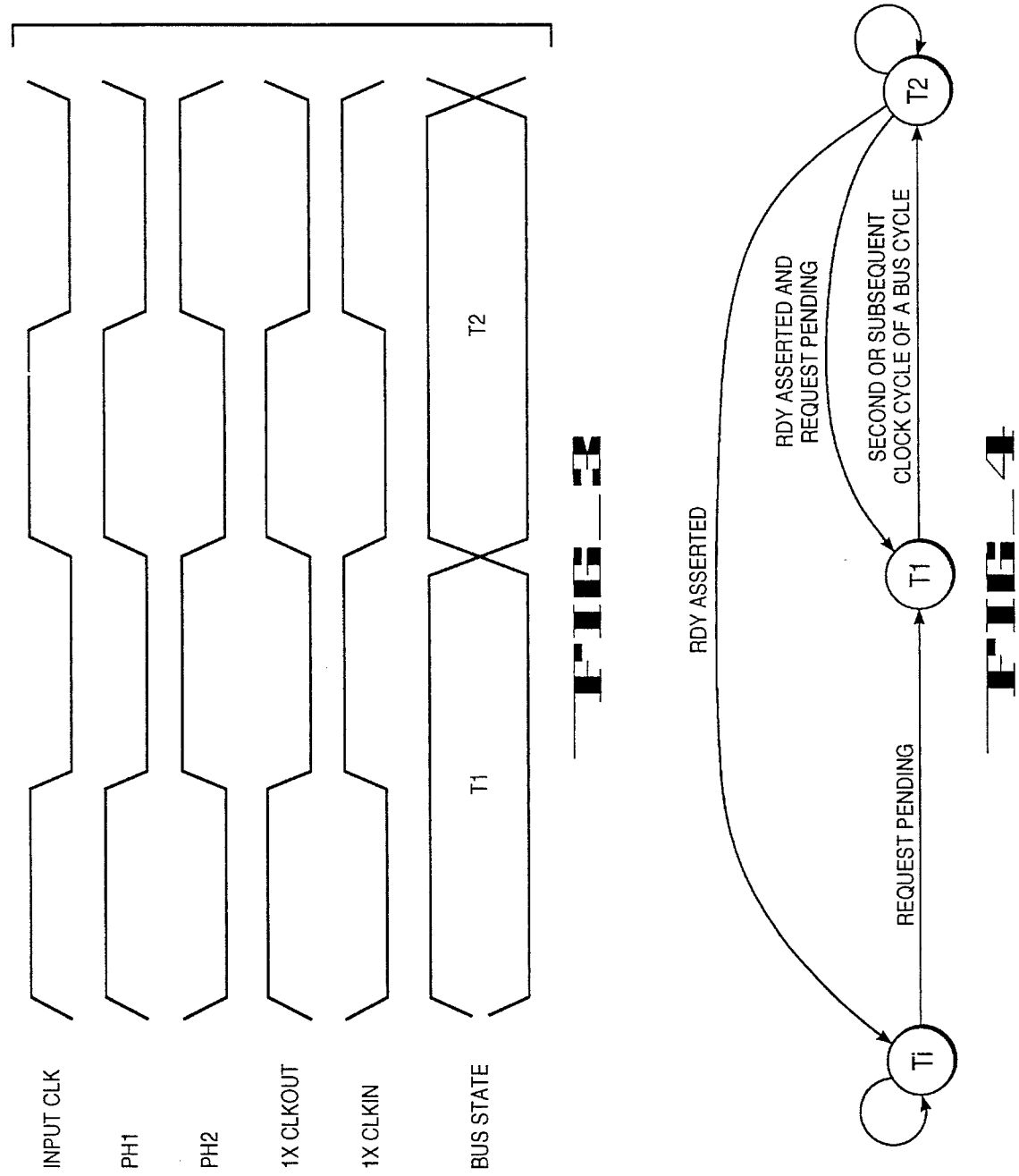

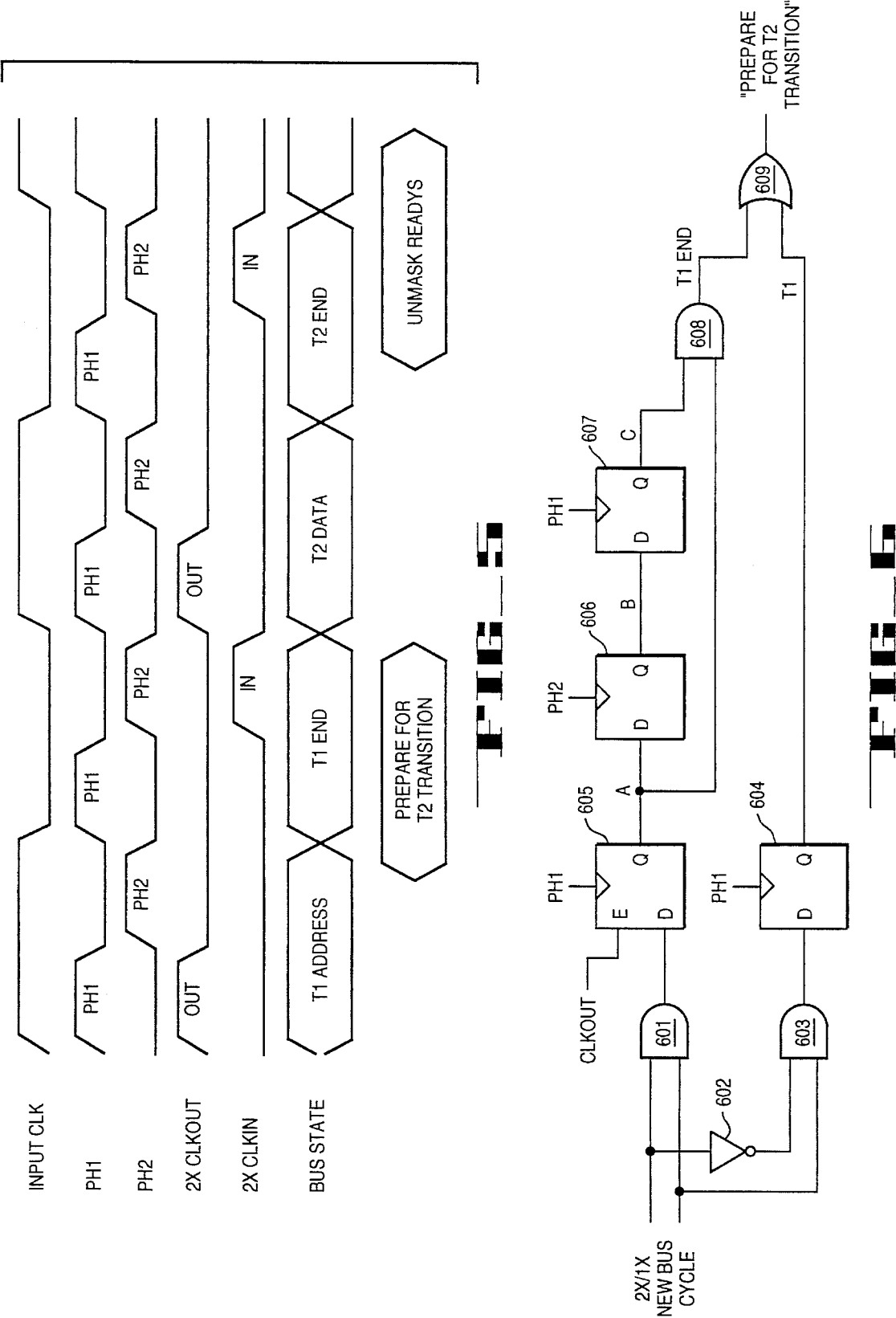

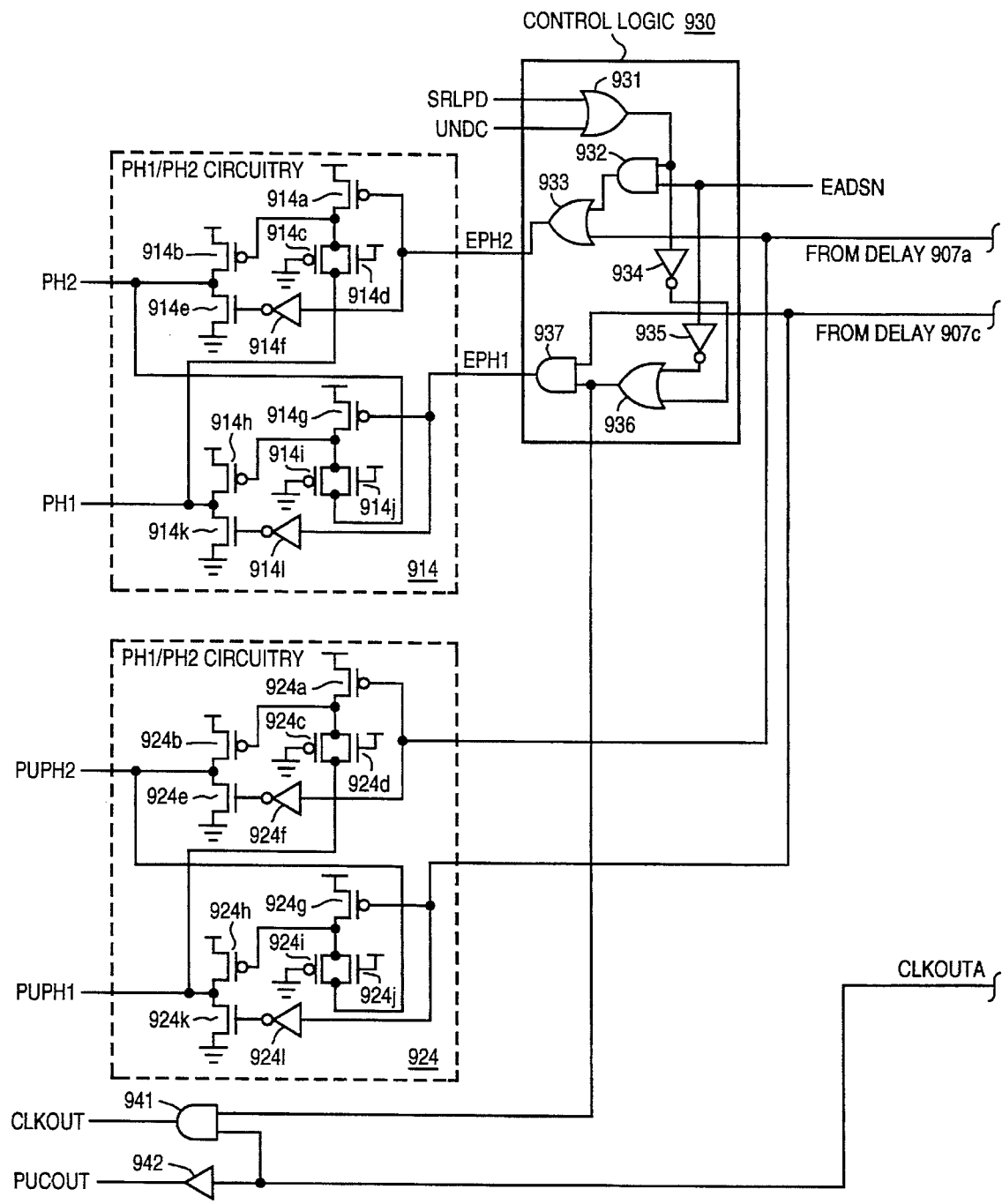
FIG_9A

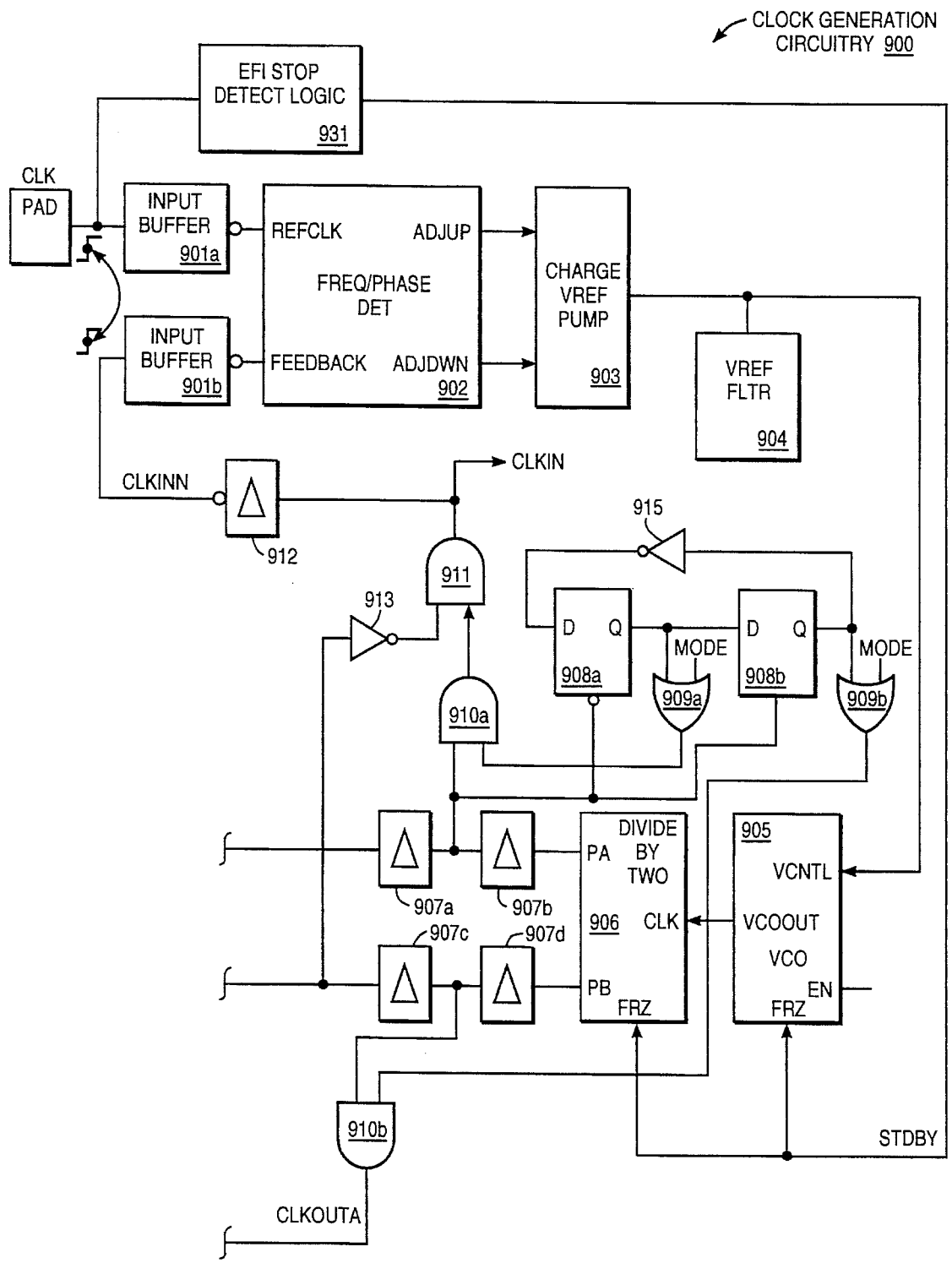
FIG_9B

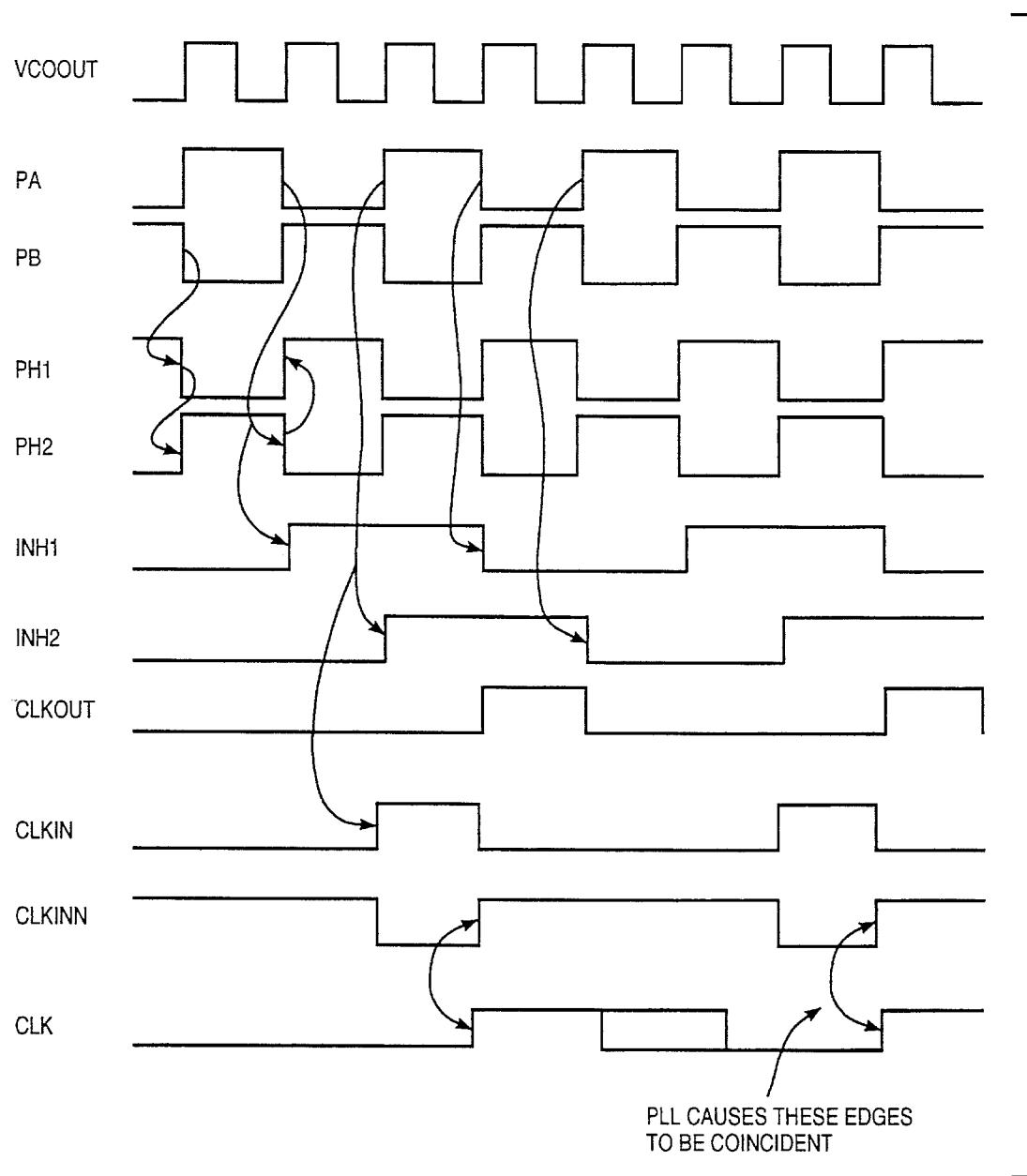
FIG_10

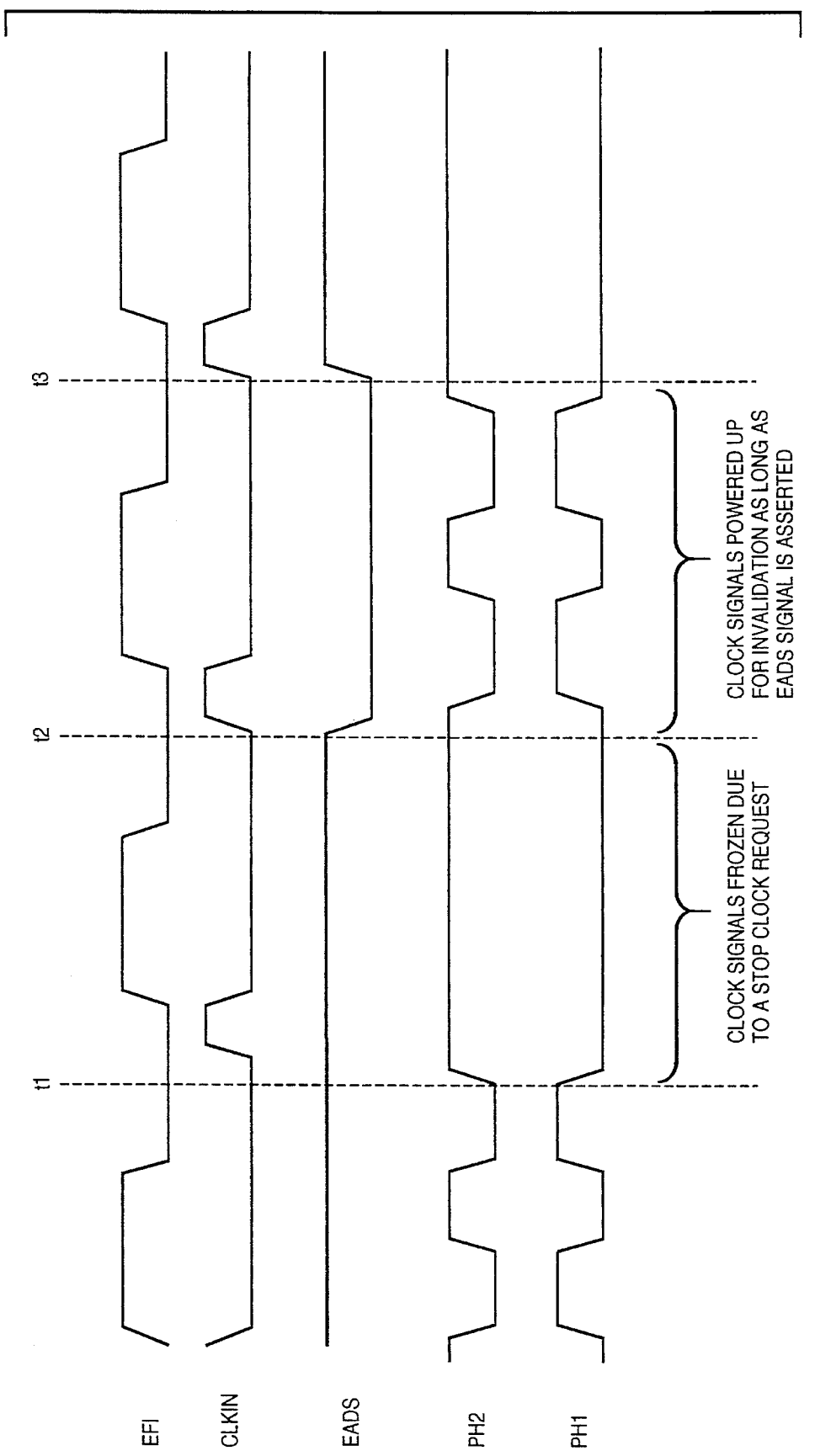
FIG_11

METHOD AND APPARATUS FOR INVALIDATING A CACHE WHILE IN A LOW POWER STATE

This is a continuation-in-part application of application entitled, "Microprocessor Having A Core Which Operates At Twice The Frequency Of The Input Clock Of The Microprocessor", Ser. No. 07/778,575, filed on Oct. 17, 1991, now abandoned.

FIELD OF THE INVENTION

The present invention relates to the field of computers and computer systems. More specifically, the invention relates to features incorporated within a computer system or within a microprocessor for controlling clocking signals.

BACKGROUND OF THE INVENTION

Typically, a computer system contains a processor, a bus, and other peripheral devices. The processor is responsible for executing instructions using the data in the computer system. The bus is used by the microprocessor and the peripheral devices for transferring information between one another. The information on the bus usually includes data, address and control signals. The peripheral devices comprise storage devices, input/output I/O devices, etc. Generally, all operations being performed in the computer system occur at the same frequency.

The microprocessor has a core for processing the data. Since generally all operations performed by the computer system occur at the same frequency, the logic operations performed by the core are at the same frequency as the transfer of data, address and control signals on the computer system bus.

Some logic operations performed by the core, such as arithmetic operations, require multiple cycles to complete. During completion of these multiple cycle operations, the bus remains idle. It is desirable to have the core operate at a faster speed than the bus, so that operations are performed more quickly. In this manner, the bus will be used more frequently, such that bus idle states will be reduced and operations performed more quickly.

Many techniques exist to reduce the power consumed by the processor. One technique for this has been to stop the processor regardless of the current instruction being executed. Methods have been employed whereby the processor is stopped on predetermined conditions. Another mechanism used in the prior art causes the processor to stop asynchronously by disabling the externally generated clock signal utilized to generate the internal clock of the device.

A problem with asynchronously disabling the external reference frequency generator involves the fact that most microprocessors and computer systems utilize a phase-locked loop (PLL) circuit to multiply the reference frequency by some factor to generate the system's internal clock rate. The internal clock signal is utilized by the central processing unit (CPU) of the computer during the execution of its various functions and instructions. A problem arises is that if the clock is stopped externally, then the internal phase-locked loop circuitry is likewise disabled. Under such circumstances, re-enabling the external reference frequency does not produce an instantaneous response from the PLL. In other words, the PLL requires some fixed time period (e.g., hundreds of milliseconds) to stabilize and achieve lock. During this start-up time period, spurious signals and glitches are commonly generated, leading to unpredictable results. Thus, starting and stopping of the processor's clock by disabling the external reference input frequency results in a loss of pseudo-instantaneous response. What is needed is a means for reducing power consumption in a processor which does not cause a PLL in a computer system to become unstabilized, such that spurious signals and glitches result. That is, it is desirable to have a mechanism for reducing power in a processor which can be utilized such that the remainder of the computer system is unaware of its use (i.e., it is transparent).

Many of today's processors include a small on-chip memory used to temporarily store data and instructions for use by the processor. These small on-chip memories are referred to as caches. The data in the cache represents a portion of the data in the main memory. If the data is changed in the main memory, data in the cache may no longer be current. In the prior art, where data in the cache is no longer current, it is invalidated. This invalidation is performed to ensure that the processor only receive data from the cache which is current. This is referred to as cache coherency. Often the invalidation is no more than setting or resetting a bit in the cache corresponding to the storage location of the invalid data.

Problems exist where a microprocessor which includes a cache is powered down or placed in a state of lower power consumption. One problem occurs where an access is made to the memory while the processor is in the reduced power consumption state. In this situation, the processor is unable to invalidate data in the internal cache to maintain cache coherency. Therefore, when the processor returns to the powered up state, it may use invalid data. Various prior art solutions have been employed to address this problem. One prior art solution is to flush the cache before entering the low power down state, so that all the data in the cache is marked as invalid. The other solution is to flush the cache immediately upon powering up. Flushing the cache results in a large performance penalty in that the processor is unable to execute any instructions because there is no data or instructions in the cache. Therefore, if the cache has been flushed, the processor is delayed the amount of time necessary to obtain data and instructions from memory. It is desirable to avoid having to flush the cache when entering or executing a powered down state. Similarly, it is desirable to maintain cache coherency in a low power state.

When additional features are integrated in a microprocessor, its use most often requires changes to the computer system to accommodate the new features. These changes could take the form of modifications to the circuit board, including adding extra circuitry. Ideally, new features and faster processing should be added without changing, for example, the mother board of a computer system. It is thus advantageous to modify microprocessors by incorporating new features in such a way as to reduce or dispense with changes to the remainder of the computer system. It is also advantageous to keep the number of hardware changes small so that preexisting computer applications can benefit by upgrading their computer systems without having to acquire new system components, thereby avoiding huge expenditures.

The present invention provides a means for invalidating lines in a cache when in a non-clocked low power state.

SUMMARY OF THE INVENTION

A method and apparatus for allowing an integrated circuit to invalidate an individual line of its internal cache while in a non-clocked low power state is described. The method and apparatus includes a phase locked loop (PLL) circuit which generates at least one clock signal. The method and apparatus also includes processing data synchronous with at least one clock signal using a processor. A cache stores data and a plurality of instructions to the processor. The present invention also includes a method and apparatus for placing the integrated circuit in a reduced power consumption state. The present invention further includes a method and means for powering up the integrated circuit out of the reduced power consumption state to invalidate data in the cache in order to maintain cache coherency while in the reduced power consumption state.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is a block diagram of the computer system of the present invention.

FIG. 2 is a block diagram of the currently preferred embodiment of the microprocessor of the present invention.

FIG. 3 illustrates the timing signals generated by the clock generator of the currently preferred embodiment of the present invention for the 1× core mode.

FIG. 4 is a bus state diagram for the 1× core mode.

FIG. 5 illustrates the timing signals generated by the clock generator of the currently preferred embodiment of the present invention for the 2× core mode.

FIG. 6 is one embodiment of the logic circuitry for generating the "prepare for T2 transition" logic signal.

FIGS. 9A and 9B are a circuit schematic of the clock generator of the currently preferred embodiment of the present invention.

FIG. 10 illustrates the timing signals associated with the phase locked loop of the present invention.

FIG. 11 is a timing diagram illustrating the cache invalidation cycle.

DETAILED DESCRIPTION OF THE INVENTION

Figure 7:
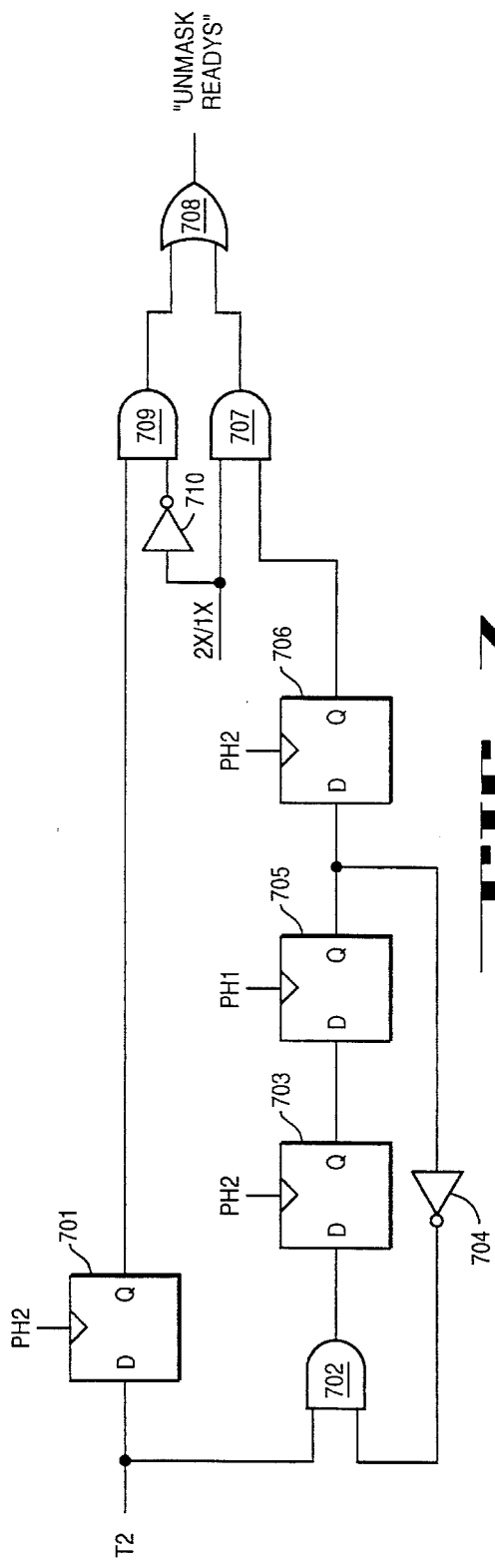
FIG. 7 illustrates one embodiment of the logic circuitry for generating the "unmask readys" logic signal.

A method and apparatus for invalidating a cache is described. In the following description, numerous specific details are set forth such as specific numbers of signals, gates, frequencies, etc., in order to provide a thorough understanding of the present invention. It will be obvious, however, to one skilled in the art that the present invention may be practiced without these specific details. In other instances, well-known computer operations and components have been shown in block diagram form, rather than in detail, to avoid unnecessarily obscuring the present invention.

Overview of the Computer System of the Present Invention

Referring first to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

As illustrated in FIG. 1, a computer system, as may be utilized by the preferred embodiment of the present invention, generally comprises a bus or other communications means 101 for communicating information, a processor 102 coupled with bus 101 for processing information, a random access memory (RAM) or other dynamic storage device 104 (commonly referred to as a main memory) coupled with bus 101 for storing information and instructions for processor 102, a read only memory (ROM) or other static storage device 106 coupled with bus 101 for storing static information and instructions for processor 102, a data storage device 107, such as a magnetic disk and disk drive, coupled with bus 101 for storing information and instructions. Note that in the present invention, processor 102 includes an internal cache for temporarily storing instructions and data for use in processor 102. Note also that in the currently preferred embodiment, processor 102 comprises the 80486DX2 brand microprocessor of Intel Corporation of Santa Clara, Calif.

The computer system also includes a display device 121, such as a cathode ray tube, liquid crystal display, etc., coupled to bus 101 for displaying information to the computer user, an alphanumeric input device 122 including alphanumeric and other keys, etc., coupled to bus 1 01 for communicating information and command selections to processor 102 and a cursor control device 123 coupled to bus 1 01 for controlling cursor movement. Moreover, the system includes a hard copy device 124, such as a plotter or printer, for providing a visual representation of the computer images. Hard copy device 124 is coupled with processor 102, main memory 104, static memory 106 and mass storage device 107 through bus 101.

The computer system also includes cache invalidation cycle detection and power up control logic 131 coupled to bus 101 and processor 102 for monitoring bus 101 for memory (i.e., direct memory access [DMA]) cycles to main memory 104. Upon detecting that a write occurred to a memory location in main memory 104 by other than processor 102, cache invalidation cycle detection and power up control logic 131 causes processor 102 to power up, such that portions of its internal cache may be marked as invalid if the address of the memory location accessed in main memory 104 is within the internal cache of processor 102. Note that in one embodiment, cache invalidation cycle detection and power up control logic 1 31 comprises a signal.

Of course, certain implementations and uses of the present invention may not require nor include all of the above components. For example, in certain implementations a keyboard and cursor control device for inputting information to the system may not be required. In other implementations, it may not be required to provide a display device for displaying information.

Overview of the Processor of the Present Invention

FIG. 2 shows a block diagram of the processor, processor 200, utilized by the preferred embodiment of the present invention. Processor 200 is preferably manufactured as an integrated circuit using a metal-oxide-semiconductor (MOS) process. Referring to FIG. 2, processor 200 generally comprises cache 201, prefetch buffers 202, instruction decoder 203, microcode unit 204, datapath 205, address generator 206, floating-point unit 207, bus interface unit (BIU) 208, write buffers 209, clock generator 21 0 and pad interface 211. All of the units of the processor except the bus controller in BIU 208 constitute the core of processor 200.

Pad interface 211 is coupled to clock generator 210 and BIU 208 and provides a pin interface for control, address and data signals between processor 200 and the remainder of the computer system. BIU 208 includes the bus controller and provides the necessary interface between the internal buses of processor 200, and in particular cache memory 201 and prefetch buffers 202 and the external buses responsible for fetching data from the external data memory system. In the currently preferred embodiment, the present invention uses an external 32-bit address bus and a 32-bit data bus. BIU 208 is also coupled to write buffers 209 which provide a buffer storage area for data which is to be transferred from processor 200 to the remainder of the computer system. In the currently preferred embodiment, write buffers 209 provide buffer storage for data which is transferred off-chip. BIU 208 is coupled to receive clock signals from clock generator 210 on line 220 and line 221. Note that in the currently preferred embodiment, only those portions of BIU 208 that interface with pad interface 211 operate at the same clock frequency, while the remainder operates at twice the frequency.

Cache 201 stores instructions and data for execution by processor 200. Prefetch buffers 202 is coupled to cache 201 and is responsible for prefetching data and instructions from cache 201 or from BIU 208 for use in execution by processor 200.

Instruction decoder 203 decodes the incoming instructions. Instruction decoder 203 is coupled to receive the instructions from prefetch buffers 202 and sends the decoded instructions, in the form of microcode, to datapath 205 for execution. Microcode unit 204 contains a memory (CROM) which stores the microcode instructions (microcode) for the processor. Microcode unit 204 is coupled to instruction decoder 203 and shares control of instruction execution with instruction decoder 203 in a manner well-known in the art. Microcode unit 204 provides address generator 206 with address information which address generator 206 uses to generate addresses corresponding to data necessary in the execution of the decoded instructions. Address generator 206 provides the addresses for either datapath 205 or floating point 207 depending on the instruction type.

Microcode unit 204 is also responsible for instruction boundary processing, such as interrupt/exception arbitration, and the halting of instruction decoder 203 when necessary. Microcode unit 204 is also responsible for handling most of the freeze conditions, such as cache memory miss, etc.

Datapath 205 is the main execution data path for the processor. Datapath 205 contains the arithmetic logic unit, register file, barrel shifter, constant read-only memory (ROM) and flags. Datapath 205 is coupled to prefetch buffers 202 and requests data from cache 201, via prefetch buffers 202. Datapath 205 executes the microcode provided by instruction decoder 203 using the data received from prefetch buffers 202 according to the addresses generated by address generator 206.

Processor 200 also includes floating point unit 207, which is coupled to address generator 206. Floating point unit 207 contains logic to execute the floating point instructions.

Clock generator 21 0 generates the clock signals for processor 200. In the present invention, clock generator 210 generates the clock signals in response to an external frequency clock input (EFI) signal, which it is coupled to receive. In the currently preferred embodiment, the EFI clock signal has a frequency of 33 MegaHertz (MHz). Clock generator 210 supplies the clock signals to BIU 208 via bus (i.e., I/O) clock signal line 220 and the remainder of units in processor 200 via core clock signal line 221. Clock generator 21 0 sends clock signals to pad interface 211 via lines 222. Clock generator 210 includes control logic 212 for controlling the operation of clock generator 210. In the present invention, clock control logic 212 includes logic for disabling and enabling some of the clock signals produced by clock generator 210, such that clock generator 210 does not output those clock signals. Clock control logic 212 is also responsible for controlling the frequency of the core clock signals of line 221 in comparison to the frequency of the bus (i.e., I/O) clock signals 220 and the clock signals 222 output to pad interface 211.

The block diagram of FIG. 2 is realized with ordinary circuits. Control signals not required for an understanding of the present invention are not illustrated in FIG. 2. Additionally, functions not required for an understanding of the present invention are not shown in order to facilitate an understanding of the invention. Note also that some lines may comprise multiple conductors.

Clock Signals of the Present Invention

Clock generator 210 of the present invention provides core clock signals and bus clock signals for processor 200. The core clock signals clock the operations performed by the units which constitute the core, including the bus controller. In the currently preferred embodiment, the core clock signals are referred to as phase one (PH1) and phase two (PH2). The present invention also generates clock signals which are referred to as power up phase one (PUPH1) and power up phase two (PUPH2). The PUPH1 and PUPH2 clock signals are the same as the PH1 and PH2 core clock signals and clock the operation of control logic responsible for placing the processor in and out of a reduced power consumption state (i.e., the powered and powered down states), including any synchronizers that are required. The bus clock signals clock the transfer of data occurring on the computer system bus. Data transfers occur in two clock phases. During an out phase, data is driven out onto the bus, while during an in phase, data is driven into processor 200 from the bus. In the currently preferred embodiment, the bus clock signals generated by clock generator 210 corresponding to the out and in phases are the CLKOUT and CLKIN signals respectively (line 222). Note that in the currently preferred embodiment, all external timing parameters are specified with respect to the rising edge of the external clock input (EFI).

In the present invention, clock generator 210 has multiple modes of operation. In one mode, clock generator 210 is capable of providing core clock signals at the same frequency as the bus clock signals. This is referred to herein as the 1× mode. In another mode, clock generator 210 provides core clock signals at a frequency which is a multiple of the bus clock signals. In other words, clock generator 210 of the present invention is capable of providing core signals which are two times (2×), three times (3×), four times (4×), etc. the frequency of the bus clock signals. In the currently preferred embodiment, clock generator 210 of the present invention provides core clock signals at the same frequency as the bus clock signals in one mode (i.e., the 1× mode) and provides core clock signals at two times (2×) the frequency of the bus clock signals in another mode (i.e., the 2× mode).

In the currently preferred embodiment, in the 1× mode, the core clock signals and the bus clock signals are at the frequency of the EFI, which is 33 MHz. Thus, the bus clock signal, CLKOUT and CLKIN, are the same as the core clock signals, PH1 and PH2 and the PUPH1 and PUPH2 clock signals (with the exception of a small delay). In the currently preferred embodiment, in the 2× mode, the core clock signals are at 66 MHz and the bus clock signals are at 33 MHz. To reiterate, the core clock signals control the operation of the core of processor 200 including the bus controller in BIU 208. Thus, in the currently preferred embodiment, during the 2× mode, all portions of the core are operating at 2× the input clock frequency (i.e., EFI) including the bus controller. Only a small portion of BIU 208 has an indication that the bus is operating at the same frequency of the EFI (e.g., 33 MHz).

The mode of clock generator 210 is determined according to a clock control signal. In the currently preferred embodiment, the clock control signal indicates whether clock generator 210 operates in the 1× or 2× mode. In the currently preferred embodiment, the 1×/2× clock control signal is derived from a bond option. This selectability allows a single die to fulfill the requirements of a number of processor types using wire bond programming of the clock control signal bond pad. In the currently preferred embodiment, by wiring the bond pad, clock generator 210 can be set to operate only in either the 1× mode or can be set to operate in the 2× mode. Note that the clock control signal could be derived by other means.

In order for a processor to be able to operate at both 1× and 2× modes of operation, the bus input and output clock implementation has a particular timing relationship, which allow for a straightforward 1× bus frequency to 2× core frequency interface. To reiterate, in 2× mode, the core and the bus controller operate at twice the input clock frequency. It should be noted that in the present invention, the bus controller operates at 2× the input clock frequency to allow the write buffers to be loaded at a rate of up to one load per core clock. Therefore, the write buffers are loaded whether or not the bus is ready and each write is completed as the bus becomes available. In this manner, the core is able to continue operating without having to wait for the slower bus. Also in the currently preferred embodiment of the present invention, in order to make the 1× bus to 2× core interface straightforward, the architecture of processor 200 is designed in a such a manner as to provide a very contained 1×/2× boundary. The boundary between the 1× bus and 2× core is contained by interfacing BIU 208 with cache 201 only.

With respect to the clock signals, in the 2× mode of the present invention, the core PH1 and PH2 signals (and the PUPH1 and PUPH2 clock signals) have a timing relationship with respect to the CLKIN and CLKOUT bus clock signals, such that the I/O buffers can communicate properly with the core of the processor. In the 2× mode of the currently preferred embodiment, the CLKOUT and CLKIN signals are quarter duty cycle and are offset with respect to each other. That is, during the 2× mode, bus clock signals, CLKOUT and CLKIN, are quarter duty cycle clock signals that are synchronized with every other core clock signal PH1 and PH2 respectively. In the currently preferred embodiment, since the original phase high time of the 2× mode core phases, PH1 and PH2, are utilized by the 1× mode bus clock signals, CLKOUT and CLKIN, and the phases of the bus clock signals are aligned with the beginning and ending of the 2× core clock signals, the circuitry required to drive the half speed bus is reduced.

Note that quarter duty cycles are distinguished from half duty cycles in which the high and low times for the signal are equal. In quarter duty cycle signals, the high and low times for the signal are not even, such that the high or low time is only one quarter the total time for a high/low transition. Note that in the present invention, the pulse width of the core clock signal is the same as the pulse width of the bus clock signals regardless of whether the core clock signals are 1×, 2×, 3×, 4×, etc., the frequency of the bus clock signals.

The Clock Signals of the Present Invention

The timing signals generated by the currently preferred embodiment of clock generator 210 during 1× mode are shown in FIG. 3. Referring to FIG. 3, the input clock signal CLK (i.e., EFI) is shown. PH1 and PH2 are the 1× core clock signals. Note that the PUPH1 and PUPH2 clock signals are not shown but are the same as the PH1 and PH2 core clock signals. The CLKOUT and CLKIN signals are the bus clock signals that are synchronized with every other PH1 and PH2 core clock signal respectively.

FIG. 3 also shows the BUS STATE for the computer system of the present invention during 1× mode. The bus cycle starts at T1 when the addresses are driven out onto the computer system bus when the CLKOUT signals transition high. The bus controller then uses logic to set up a transition from T1 to T2 during the PH2 core clock signals of T1. At the start of T2, data is driven onto the computer system bus when the CLKOUT signal transitions high if the cycle is a write cycle; otherwise, nothing occurs during the CLKOUT high state. During T2, data is returned from the computer system bus during the CLKIN phase. The data is used if a ready signal indicates that the data is good. At this state, the bus controller can transition to either new T2, a new T1 or an idle state depending on the cycle type. FIG. 4 illustrates the bus state diagram for the 1× core mode. Referring to FIG. 4, state Ti corresponds to the idle state, such that while the processor is idle or enters the idle state the bus state transitions to state Ti. The bus state machine transitions to state T1 when a request is pending. This occurs at the first clock cycle of a bus cycle. As stated above, in the T1 state, addresses are driven out onto the computer system bus when CLKOUT goes high. From the T1 state, the state machine transitions to the T2 state at the second or subsequent clock cycle of a bus cycle. Once in the T2 state, if the cycle is a write cycle, then the data is driven onto the computer system bus when CLKOUT transitions. If the cycle is a read cycle, data is returned from the system bus during CLKIN. Also, during the T2 state, the ready signal is sampled. If the ready signal is asserted and no request for the bus is pending, then the state machine transitions to the Ti state. If the ready signal is asserted and a bus request is pending, then the state machine transitions to the T1 state.

The timing signals generated by the currently preferred embodiment of clock generator 210 during 2× mode are shown in FIG. 5. Referring to FIG. 5, the input clock signal CLK (i.e., EFI) is shown. The PH1 and PH2 are the core clock signals. Note that the PUPH1 and PUPH2 clock signals are not shown but are the same as the PH1 and PH2 core clock signals. The CLKOUT and CLKIN signals are quarter duty cycle bus clock signals. Note that the CLKOUT and CLKIN signals are synchronized with every other PH1 and PH2 core clock signal respectively.

FIG. 5 also shows the BUS STATE for the computer system of the present invention. The bus cycle starts at T1 ADDRESS when the addresses are driven out onto the computer system bus when the CLKOUT signals transition high. It should be noted that T1 is split into two states, T1 ADDRESS and T1 END. This effectively adds a wait cycle to T1. The present invention includes logic to prevent the bus controller from realizing that it is in T1 during the T1 ADDRESS time. At T1 END, the bus controller determines that it is in T1. For this case, when the core is operating at twice the speed of the bus, if the bus controller were not modified, it would attempt to transition from T1 ADDRESS to T2 instead of T1 END. The bus controller now sets up a transition from T1 to T2 during the PH2 core clock signals of T1 END. At the start of T2 DATA, data is driven onto the computer system bus when the CLKOUT signal transitions high if the cycle is a write cycle; otherwise, nothing occurs during the CLKOUT high state. During T2 END, data is returned from the computer system bus during the CLKIN phase. The data is used if a ready signal indicates that the data is good. At this state, the bus controller can transition to either new T2, a new T1 or an idle state depending on the cycle type.

The bus controller of the present invention is modified with the addition of a holdoff signal which holds off the initiation of the transition from the T1 state to the T2 state until the end of T1 END. In the present invention, the hold off is accomplished with the addition of "prepare for T2 transition" logic signal, which is shown in FIG. 5. The timing of the external ready signals is critical to the operation of the state machines of the bus controller. Furthermore, in the present invention, circuitry masks ready inputs until the "unmask readys" period occurs as shown in FIG. 5. The additional logic required to accomplish the hold off is very minimal. Using the hold off circuitry allows the present invention to interface processor 200 with the computer system bus in 2× mode without having to include additional output drivers and input latches.

FIG. 6 illustrates one embodiment of the "prepare for T2 transition" holdoff logic. Referring to FIG. 6, logic 600 comprises D flip-flops 604–607, AND gates 601, 603 and 608, inverter 602 and OR gate 609. One input to AND gate 601 is the 2×/1× core mode indication signal. The other input is the new bus cycle signal which indicates when a new bus cycle occurs. The output of AND gate 601 is coupled to the D input of flip-flop 605. The enable input (E) of flip-flop 605 is also coupled to the CLKOUT bus clock signal. Flip-flop 605 is clocked by the PH1 core clock signal. The Q output of flip-flop 605 is coupled to the D input of flip-flop 606, which is clocked by the PH2 core clock signal. The Q output of flip-flop 606 is coupled to the D input of flip-flop 607, which is clocked by the PH1 core clock signal. The Q output of flip-flop 607 is coupled to one of the inputs of AND gate 608. The other input to AND gate 608 is coupled to the output of flip-flop 605. The output of AND gate 608 is coupled to one of the inputs of OR gate 609. The other input to OR gate 609 is coupled to the Q output of flip-flop 604, which is clocked by the PH1 core clock signal. The D input of flip-flop 604 is coupled to the output of AND gate 603. One input to AND gate 603 is coupled to new bus cycle indication signal. The other input to AND gate 603 is coupled to the output of inverter 602. The input of inverter 602 is coupled to the 2×/1× mode indication signal. The output of OR gate 609 is the "prepare for T2 transition" logic signal.

The 2×/1× signal controls the outputs of AND gates 601 and 603. When the 2×/1× signal is low, indicating that the processor is in 1× mode, the output of AND gate 603 is enabled, via inverter 602, and the output of AND gate 601 is disabled. When the 2×/1× signal is high, indicating that the processor is in 2× mode, the output of AND gate 601 is enabled and the output of AND gate 603, via inverter 602 is disabled. Thus, AND gates 601 and 608 in conjunction with flip-flops 605–607 comprises the 2× path for logic 600, while AND gate 603, inverter 602 and flip-flop 604 form the 1× path.

If the 2×/1× signal indicates that the processor is operating in 1× mode, the output of AND gate 603 will be high when a new bus cycle occurs (as indicated by the new bus cycle input to AND gate 603). The new bus cycle signal is a function of the PH2 core clock signal. Thus, when the new bus cycle occurs, the D input to flip-flop 604 is high. When the D input to flip-flop 604 is high, the Q output of flip-flop 604 goes high after the next assertion of the PH1 core clock signal. The Q output of flip-flop 604 represents the T1 state during the 1× mode of operation. The Q output always being high causes the output of OR gate 609 to be high. Thus, in the 1× mode, the "prepare for T2 transition" signal is always high.

If the 2×/1× signal indicates that the processor is operating in 2× mode, then the output of AND gate 601 is high. The output of AND gate 601 is received into the D input of flip-flop 605 and causes the Q output (at node A) to change state when the CLKOUT and PH1 signals are asserted. The output of flip-flop 605 propagates through flip-flops 606 and 607 on successive assertion of the PH2 and PH1 clock signals respectively. Until the Q output of flip-flop 607 (at node C) goes high, the output of AND gate 608 will be low. Thus, when the Q output of flip-flop 605 propagates through flip-flops 606 and 607, then the output of AND gate 608 will go high. The output of AND gate 608 being high represents the T1 END bus state. The high output of AND gate 608 also causes the output of OR gate 609 to go high, such that the "prepare for T2 transition" logic signal is high.

FIG. 7 illustrates one embodiment of the "unmask readys" holdoff logic. Referring to FIG. 7, logic 700 comprises D flip-flops 701, 703, 705 and 706, AND gates 702, 707 and 709, inverters 704 and 710 and OR gate 708. The T2 state signal is coupled to one input of AND gate 702. The other input to AND gate 702 is coupled to the output of inverter 704. The output of AND gate 702 is coupled to the D input of flip-flop 703, which is clocked by the PH2 core clock signal. The Q output of flip-flop 703 is coupled to the D input of flip-flop 705, which is clocked by the PH1 core clock signal. The Q output of flip-flop 705 is coupled to the input of inverter 704 and the D input of flip-flop 706, which is clocked by the PH2 core clock signal. The Q output of flip-flop 706 is coupled to one input of AND gate 707. The other input to AND gate 707 is coupled to the 2×/1× mode indication signal. The output of AND gate 707 is coupled to one input of OR gate 708. The other input to OR gate 708 is coupled to the output of AND gate 709. The inputs to AND gate 709 are coupled to the output of inverter 710 and the Q output of flip-flop 701, which is clocked by the PH2 core clock signal. The input of inverter 710 is coupled to the 2×/1× mode indication signal. The input of flip-flop 701 is coupled to the T2 state signal. The output of OR gate 708 is the "unmask readys" signal.

The "unmask readys" logic 700 generates the "unmask readys" signal. The 2×/1× mode selection signal controls which source input drives the output of OR gate 708, which is the "unmask readys" logic signal. If the 2×/1× mode selection signal indicates that the processes is in 1× mode, the output of AND gate 707 will be disabled and the output of AND gate 709 will be enabled, via inverter 710. If the 2×/1× mode selection signal indicates that the processor is operating in 2× mode, then the output of AND gate 707 will be enabled and the output of AND gate 709 will be disabled, via inverter 710. Thus, the 2×/1× mode selection signal indicates whether the output of OR gate 708 will be derived from flip-flop 701 or from the combination of AND gate 702, inverter 704 and flip-flops 703, 705 and 706.

If the 2×/1× signal is low, indicating that the processor is in 1× mode, then the "unmask readys" signal will be high whenever the Q output of flip-flop 701 is high. When the bus state machine transitions into the T2 state, the T2 signal is asserted. Note that the T2 signal is a function of the PH1 core clock signal. When the next PH2 core clock signal is asserted, the high T2 input causes the Q output of flip-flop 701 to go high, such that while the bus state machine is in state T2 the output of OR gate 709 is high. Thus, the "unmask readys" signal is high.

If the 2×/1× signal is high, indicating that the processor is in 2× mode, then the "unmask readys" signal will be high whenever the Q output of flip-flop 706 is high. The output of flip-flop 706 is high when its D input is high and the PH2 core clock signal is asserted. The D input of flip-flop 706 will be high when the output of AND gate 702 is high and a PH2 and PH1 clock pulses are asserted in succession by flip-flops 703 and 705. The output of AND gate 702 is high when the T2 signal is high and when the output of inverter 704 is high. Before the bus state machine transitions into the T2 state, the output of flip-flop 705 is low, such that the output of inverter 704 is high. Thus, when the bus state machine transitions into the T2 state and the T2 signal goes high, the output of AND gate 702 goes high. Then after the assertion of the PH2, PH1 and PH2 core clock signals in succession, the high output from AND gate 702 propagates through flip-flops 703, 705 and 706 respectively, thereby causing the output of OR gate 708 to go high. In this manner, the "unmask readys" signal is asserted.

Note, however, that once the signal propagates through flip-flop 705, the output of inverter 704 goes low, thereby causing the output of AND gate 702 to go low. When this occurs, the "unmask readys" signal will go low after successive PH2, PH1 and PH2 core clock pulses. The feedback from the output of flip-flop 705 to the input of AND gate 702, via inverter 704, is required when multiple back to back T2 states occur, such as during burst cycles.

Figure 8:
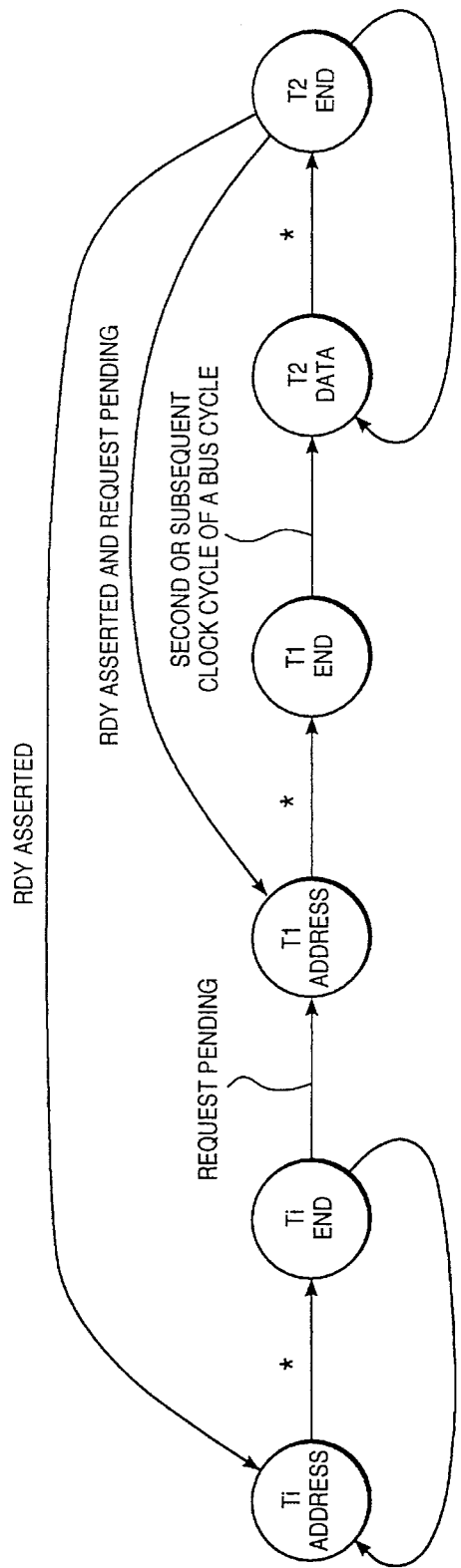
FIG. 8 is a bus state diagram for the 2× core mode.

In the currently preferred embodiment, the holdoff signal is generated by a holdoff generator in the bus controller. In the currently preferred embodiment, the holdoff signal asserts when CLKOUT is asserted and remains asserted for two core clock phases. This prevents the bus controller from transitioning prematurely. FIG. 8 illustrates a bus state diagram for the 2× mode. Referring to FIG. 8, Ti ADDRESS and T1 END represents the idle state when the bus is idle. The bus state machine transitions from the Ti ADDRESS state to the Ti END state when the second core PH1 clock signal of the current cycle has started. The bus state machine transitions from the Ti END state to the T1 ADDRESS state at the start of the first clock cycle of a bus cycle when a request for the bus is pending. During the T1 ADDRESS state, the addresses are driven out from the processor when the CLKOUT bus clock signal goes high. The bus state machine transitions to the T1 END state when the second core PH1 clock signal of the current clock cycle has started. During the T1 END state, the bus controller sets up for a transition into state T2. The bus state machine transitions between the T1 END state and the T2 DATA state at the start of the second or subsequent clock cycles of a bus cycle. In the T2 DATA state, if the bus cycle is a write cycle, then the data is driven onto the computer system bus when the CLKOUT bus clock signal transitions. The bus state machine transitions from the T2 DATA state to the T2 END state when the second core PH1 clock of the current clock cycle has started. During the T2 END state, if the bus cycle is a read cycle, the data is returned from the system bus during the CLKIN bus clock. Also, during the T2 END state, the ready signals are unmasked and sampled. If a ready signal is asserted and no bus request is pending, then the state machine transitions from the T2 END state to the Ti Address state. If a ready signal is asserted and a request is pending, then the bus state machine transitions from the T2 END state to the T1 ADDRESS state.

In the currently preferred embodiment, the holdoff generator is activated using the 1×/2× signal. In the currently preferred embodiment, an AND gate enables and disables the holdoff generator using the 1×/2× selection signal, wherein the AND gate outputs a logical zero when processor 200 is in 1× mode, which disables the holdoff signal.

Overview of the Clock Generator of the Present Invention

In the currently preferred embodiment of the present invention, the clock generator includes a phase locked loop (PLL), as shown in FIGS. 9A and 9B. The PLL generates both the PH1 and PH2 core clock signals, the PUPH1 and PUPH2 clock signals, the CLKOUT and CLKIN bus clock signals and the PUCOUT clock signal. In the currently preferred embodiment, the PLL is a 4× phase locked loop which is capable of generating the PH1 and PH2 core clock signals (as well as the PUPH1 and PUPH2 clock signals) at one time or two times the frequency of the bus clock signals (and the external clock input signal). Although the PLL in the currently preferred embodiment is capable of generating core clock signals at twice the frequency of the frequencies of the bus clock signals, the core clock signals of the present invention could be provided at frequencies which are multiples (2×, 3×, 4×, etc.) of the bus clock signals.

Referring to FIGS. 9A and 9B, clock generator circuitry 900 comprises input buffers 901A and B, frequency phase detector 902, charge pump 903, loop filter 904, voltage-controlled oscillator (VCO) 905, a divide-by-two circuit 906, delays 907A–D and 912, D flip-flops 908A and 908B, inverters 913, 915 and 942, OR gates 909A and 909B, AND gates 910A, 910B, 911 and 941, PH2/PH1 circuitry 914, PH2/PH1 circuitry 924, control logic 930, and EFI stop detect circuit 931.

Input buffers 901A and B buffer the signals on their inputs and output the signals in inverted form. The purpose of the buffers is to align the positive edges of their input signals so that frequency phase detector 902 can determine the phase difference between the two signals. Phase detector 902 only examines the buffered negative edges of the signals. The input of input buffer 901A is coupled to the input clock, CLK. In the currently preferred embodiment, CLK is a 33 MHz input to the processor from an external clock source. The output of buffer 901A is coupled to the REFCLK input of frequency phase detector 902. The input to input buffer 901B is coupled to delay 91 2. The input represents the feedback signal for the PLL in clock generator 900. The output of buffer 901B is coupled to the Feedback input of frequency phase detector 902.

Phase detector 902 compares the input frequencies from input buffers 901A and B and generates an output that is the measure of the phase difference between the signals. Phase detector 902 has two outputs. The ADJUP output is coupled to one of the inputs of charge pump 903. The ADJDWN output is coupled to the other input of charge pump 903. The ADJUP and ADJDWN outputs are generated when the edges of the feedback signal CLKINN lags or leads the edges of the CLK signal respectively.

Charge pump 903 is coupled to loop filter 904 and the VCNTL input of VCO 905. Charge pump 903 generates a charging or discharging current and supplies it to the capacitive elements of loop filter 904 in response to the ADJUP or ADJDWN pulses from phase detector 902 respectively. This current charges or discharges the capacitive elements in loop filter 904, generating a control voltage. The control voltage indicates the extent of difference between the input frequency of CLK signal and the feedback signal CLKINN. The control voltage is coupled to the VCNTL input of VCO 905.

VCO 905 receives the control voltage and an enable signal EN and produces VCOOUT. The VCOOUT output of VCO 905 is coupled to the CLK input of divide-by-two 906. VCO 905 is enabled when the computer system is powered up. When enabled, VCO 905 generates a frequency VCOOUT in response to the control voltage. If the frequency of the CLK signal does not equal the frequency of the feedback signal CLKINN, the frequency generated by VCO 905 deviates in the direction of the frequency of the CLK signal.

Divide-by-two 906 produces two outputs, PA and PB. These outputs are half the frequency of the output VCOOUT of VCO 905 and are non-overlapping pulses. The outputs PA and PB are coupled to delays 907B and 907D respectively. In the currently preferred embodiment, delays 907B and 907D comprise inverters. The output of delay 907B is coupled to delay 907A, one of the inputs to AND gate 910A, and the clock inputs to D flip-flops 908A and B. The output of delay 907D is coupled to the input of delay 907C and one of the inputs of AND gate 910B. In the currently preferred embodiment, delays 907A–D comprise inverters.

D flip-flop 908A generates a Q output in response to being clocked by the PA output signal of divide-by-two 906 that is buffered through delay 907B. The Q output of D flip-flop 908A is coupled to one input of OR gate 909A. The other input of OR gate 909A is coupled to the MODE signal. The Q output of D flip-flop 908B is coupled to the input of inverter 915. The output of inverter 915 is coupled to the D input of D flip-flop 908A. The Q output of D flip-flop 908A is also coupled to D input of D flip-flop 908B.

The Q output of D flip-flop 908B is also coupled to one of the inputs to OR gate 909B. The other input to OR gate 909B is coupled to the MODE signal. The outputs of OR gate 909A and 909B are coupled to inputs of AND gates 910A and 910B respectively. The output of AND gate 910B is the CLKOUTA signal. The output of AND gate 91 0A is coupled to one of the inputs of AND gate 911. The other input of AND gate 911 is coupled to the output of inverter 913. The output of AND gate 911 is the CLKIN signal. The output of AND gate 911 is also coupled to the input of delay 912. In the currently preferred embodiment, delay 912 comprises a series of inverters. The output of delay 912 is inverted and coupled to the input of buffer 901B.

The outputs of delays 907A and 907C are coupled to two inputs of control circuitry 930. The output of delay 907A is coupled to one input of OR gate 933. The other input of OR gate 933 is coupled to the output of AND gate 932. The inputs of AND gate 932 are coupled to the EADSN signal and the output of OR gate 931. The inputs of OR gate 931 are coupled to the SRLPD signal and the UNDC signal. The output of OR gate 933 is the EPH2 signal output from control circuitry 930 for input to PH1/PH2 circuitry 914. The output of delay 907C is coupled to one input of AND gate 937. The other input of AND gate 937 is coupled to the output of OR gate 936. The inputs of OR gate 936 are coupled to the outputs of inverters 934 and 935. The input of inverter 934 is coupled to the output of OR gate 931. The input of inverter 935 is coupled to the EADSN signal. The output of AND gate 937 is the EPH1 output of control circuitry 930 for input to PH1/PH2 circuitry 914.

PH1/PH2 circuitry 914 receives the EPH2 and EPH1 as inputs and produces the core clock phase signal, PH2, and the core clock phase signal, PH1. Referring to FIG. 9, the EPH2 input is coupled to the input of inverter 914F and the gate of p-channel transistor 914A. The source of transistor 914A is coupled to Vcc. The drain of transistor 914A is coupled to the gate of p-channel transistor 914B, the drain of transistor 914D and the source of transistor 914C. The gate of transistor 914D is coupled to Vcc, and the source is coupled to the PH1 output. The gate of transistor 914C is coupled to ground and its drain is coupled to the PH1 output. The source of transistor 914B is coupled to Vcc and its drain is coupled to the PH2 output and the drain of n-channel transistor 914E. The gate of transistor 914E is coupled to the output of inverter 914F. The source of transistor 914E is coupled to ground. The EPH1 input is coupled to the input of invertor 914L and the gate of p-channel transistor 914G. The source of transistor 914G is coupled to Vcc. The drain of transistor 914G is coupled to the gate of p-channel transistor 914H, the drain of transistor 914J and the source of transistor 914I. The gate of transistor 914J is coupled to Vcc, and the source is coupled to the PH2 output. The gate of transistor 914I is coupled to ground and its drain is coupled to the PH2 output. The source of transistor 914H is coupled to Vcc and its drain is coupled to the PH1 output and the drain of n-channel transistor 914K. The gate of transistor 914K is coupled to the output of invertor 914L. The source of transistor 914K is coupled to ground. The purpose of circuitry 914 is to ensure that the PH2 and PH1 signals do not overlap. Functionally, circuitry 914 allows one signal to go low before the other goes high. The operation of this implementation is well-known in the art.

The outputs of delays 907A and 907C are also coupled to two inputs of PH1/PH2 circuitry 924. With respect to PH1/PH2 circuitry 924, delay 907A is coupled to the gate of p-channel transistor 924A and the input of inverter 924F. The output of delay 907C is coupled to the gate of p-channel transistor 924G and the input of invertor 924L of PH1/PH2 circuitry 924. PH1/PH2 circuitry 924 produces the clock phase 2 signal, PUPH2, and the clock phase I signal, PUPH1. The output from delay 907A is coupled to the input of inverter 924F and the gate of p-channel transistor 924A. The source of transistor 924A is coupled to Vcc. The drain of transistor 924A is coupled to the gate of p-channel transistor 924B, the drain of transistor 924D and the source of transistor 924C. The gate of transistor 924D is coupled to Vcc, and the source is coupled to the PUPH1 output. The gate of transistor 924C is coupled to ground and its drain is coupled to the PUPH1 output. The source of transistor 924B is coupled to Vcc and its drain is coupled to the PUPH2 output and the drain of n-channel transistor 924E. The gate of transistor 924E is coupled to the output of inverter 924F. The source of transistor 924E is coupled to ground. The output of delay 907C is coupled to the input of invertor 924L and the gate of p-channel transistor 924G. The source of transistor 924G is coupled to Vcc. The drain of transistor 924G is coupled to the gate of p-channel transistor 924H, the drain of transistor 924J and the source of transistor 924I. The gate of transistor 924J is coupled to Vcc, and the source is coupled to the PUPH2 output. The gate of transistor 924I is coupled to ground and its drain is coupled to the PUPH2 output. The source of transistor 924H is coupled to Vcc and its drain is coupled to the PUPH1 output and the drain of n-channel transistor 924K. The gate of transistor 924K is coupled to the output of inverter 924I. The source of transistor 914K is coupled to ground. The purpose of circuitry 924 is to ensure that the PUPH2 and PUPH1 signals do not overlap. Functionally, circuitry 924 allows one signal to go low before the other goes high. The operation of this implementation is well-known in the art.

The CLKOUTA output of AND gate 910B is coupled to the inputs of inverter 942 and one input of AND gate 941. The other input of AND gate 941 is coupled to the output of OR gate 936. The output of AND gate 941 is the CLKOUT clock signal. The output of inverter 942 is the PUCOUT clock signal. Note that the PUCOUT signal is used to clock the output of a HOLD Acknowledge signal (not shown) which is used to acknowledge that the processor recognizes the hold state that has been placed on the computer system bus. In the currently preferred embodiment, the hold state of the bus is indicated to the processor of the present invention by a HOLD signal. The use and operation of HOLD signal and hold acknowledge (HOLDA) signals is well-known in the art.

The EFI stop detect circuit 931 is coupled to the CLK input of the phase locked loop. The output of EFI stop detect circuit 931 is coupled to VCO 905 and divide-by-two 906.

Operation of the Clock Generation Circuitry of the Present Invention

In the present, clock generation circuitry 900 produces core clock signals, PH2 and PH1, and bus clock signals, CLKIN and CLKOUT, in response to an input CLK signal (i.e., EFI). The CLK signal is received into clock generator 210 of processor 200 (FIG. 2). The signal is buffered by input buffer 901A and enters phase detector 902 with the buffer feedback signal CLKINN (also buffered). Phase detector 902 outputs either an adjust up, ADJUP, or an adjust down, ADJDWN, signal. Charge pump 903 receives the signals and generates a charging or discharging current and supplies it to the capacitive elements of loop filter 904. This current charges or discharges the capacitive elements in loop filter 904, generating a control voltage. The control voltage produced is coupled to the VCNTL input to VCO 905.

The control voltage drives the output of VCO 905. As the control voltage increases, the frequency output by VCO 905 gets higher. As the control voltage decreases, the frequency output by VCO 905 gets lower. The output of VCO 005 is input into divide-by-two 906. Divide-by-two 906 divides the output frequency of VCO 905 to produce two outputs, PA and PB, wherein every rising edge of the CLK signal produces an edge, both rising and falling, for the output signal. These outputs are half the frequency of the output VCOOUT of VCO 905 and are non-overlapping pulses.

The PA and PB signals are the drivers for the PH2 and PH1 core clock signals respectively. The PA signal is delayed by delays 907B and 907A and is then input into control circuitry 930. The PB output signal is delayed by delay 907D and then is input into control circuitry 930. Control circuitry 930 outputs the EPH2 and EPH1 inputs to PH1/PH2 circuitry 914. The outputs of circuitry 914 are the core clock signals, PH2 and PH1.

The PA output, essentially the PH2 signal as output from delay 907B, produces the feedback signal CLKINN for clock generation circuitry 900 through AND gates 910A and 911 and delay 912. The feedback signal is the CLKINN signal produced by clock generation circuitry 900. When the PLL is in lock, the high going edges of the CLK signal and the CLKINN signal will be coincident. Upon chip power-up, the control voltage VCNTRL causes the VCO frequency to increase until the frequency of occurrence of the positive edges of the two inputs CLK and CLKINN to frequency/ phase detector 902 are equal. The closed loop adjustment of the VCO frequency continues until the phase-error between the occurrence of the positive edges of CLK and CLKINN is at a minimum. The PLL is then in lock.

The AND gate 910A acts to either "swallow" the feedback signal or allow it to pass through depending on its input from OR gate 909A. During 2× mode, AND gate 910A (and AND gate 910B) masks every other clock signal. Therefore, the feedback signal being input into AND gate 911 is one-half the frequency of the feedback signal, i.e. one-half the frequency of the PH2 core clock signal during 2× mode. Inverter 91 3 is the other input to AND gate 911 and allows the feedback signal to pass through AND gate 911 when the PH1 signal, which is from the PB output of divide-by-two 906 buffered by delay 707D, is low. This ensures proper timing between the core clock signals and the bus clock signals.

The output of AND gate 911 is the CLKIN signal. In 1× mode, since the feedback signal is allowed to pass through AND gate 910A, the CLKIN signal is the same frequency as the PH2 core clock signal (and the PUPH2 clock signal). In 2× mode, since every other pulse of the feedback signal is masked, the CLKIN signal is one-half the frequency of the PH2 core clock signal. This is also the same relationship between the CLKOUT signal and the PH1 core clock signal (and PUPH1 clock signal), as output by AND gate 910B.

The CLKIN signal, i.e. the feedback signal, is delayed by delay 912 and fed back through the PLL by input buffer 901B. In 2× mode, since the feedback frequency is one-half the input CLK signal, charge pump 903 and loop filter 904 produce more voltage to compensate for the large difference between the frequencies of the CLK and CLKIN signals. The large control voltage produced causes VCO 905 to generate a higher frequency. A higher frequency from 905 produces the PH1 and PH2 core clock signals and the PUPH1 and PUPH2 clock signals that are higher in frequency. In this manner, the core clock signals of PH1 and PH2 and the PUPH1 and PUPH2 clock signals are generated by the present invention at twice (2×) the frequency of the CLK signal.

The operation of AND gate 910A is controlled by the output of OR gate 909A. Similarly, the operation of AND gate 910B is controlled by the output of OR gate 909B. When the outputs of OR gates 909A and 909B are low, then the outputs of AND gates 910A and 910B are low, thereby masking the clock signals received on their other inputs. When the outputs of OR gates 909A and 909B are high, then the other inputs of AND gates 910A and 910B are allowed to pass freely (with the exception of a small gate delay), such that the clock signals are not masked.

The outputs of OR gates 909A and 909B are controlled by each of their two inputs. One of the inputs to OR gates 909A and 909B are the Q outputs of D flip-flops 908A and 908B respectively. Furthermore, both OR gates 909A and 909B receive the MODE signal which sets the phase locked loop of clock generation circuitry 900 in its mode. In other words, the MODE signal permits the PLL to operate in 1× mode or another mode which produces core clock signals which have a frequency that is a multiple of the bus clock signals (i.e., 2×, 3×, 4×, etc.). In the currently preferred embodiment, the MODE signal selects either the 1× mode or the 2× mode. In the currently preferred embodiment, when the MODE signal is high (i.e., a logical 1), clock generation circuitry 900 is placed into 1× mode, and when the MODE signal is low (i.e., a logical 0), clock generation circuitry 900 is placed into 2× mode.

When clock generation circuitry 900 is in 1× mode, the output of OR gate 909A is always a logical 1. A logical 1 output from OR gate 909A causes the feedback signal to be passed through AND gate 910A without being masked. Moreover, the PB signal is passed through AND gate 910B as the CLKOUTA signal (and eventually the CLKOUT signal through AND gate 941). In this situation, the CLKOUT and CLKIN signals are the same frequency as the PH1 and PH2 core clock signals (and the PUPH1 and PUPH2 clock signals). Thus, the bus (FIG. 1) operates at the same frequency as the core of the processor (FIG. 2).

When clock generation circuitry 900 is switched into 2× mode, the output of OR gates 909A and 909B is determined by the output of D flip-flops 908A and 908B respectively. When the output of D flip-flop 908A is a logical 1, a logical 1 appears at AND gate 910A and allows the feedback signal to pass. When the output of D flip-flop 908A is a logical 0, a logical 0 appears at AND gate 910A, and AND gate 910A masks the feedback signal, thereby preventing it from passing through the gate. Similarly, when the output of D flip-flop 908B is a logical 1, a logical 1 appears at AND gate 910B and allows the output of the CLKOUTA signal, and when the output of D flip-flop 908B is a logical 0, a logical 0 appears at AND gate 910B, and AND gate 910B masks the CLKOUTA signal, thereby preventing it from passing through.

D flip-flops 908A and 908B are added as a second divide-by-two master/slave flip-flop. D flip-flops 908A and 908B are added off phase so that it is not in the critical path. The output of delay 907B clocks both D flip-flops 908A and 908B. However, the output of delay 907B clocks D flip-flops 908A and 908B on alternating clock pulses by having the clock input to D flip-flop 908A inverted upon receipt. Therefore, every other clock pulse of the output of delay 907B produces a logical 1 (or 0) output from D flip-flop 908A, while on the other clock pulses the output of delay 907B produces a logical 1 (or 0) output from D flip-flop 908B. Note that D flip-flops 908A and 908B produce alternating 1 and 0 outputs by being coupled with a feedback loop through inverter 915. When the D input of D flip-flop 908A is a 1 and D flip-flop 908A receives a low clock pulse (i.e., no clock signal) from delay 907B, its Q output is a 1. This Q output is then input into the D input of D flip-flop 908B, such that upon the next clock pulse, its Q output will be a 1. The Q output of 1 from D flip-flop 908B is inverted by inverter 915 and input to the D input of D flip-flop 908A, such that when the next clock pulse occurs, D flip-flop 908A will output a 0. The Q output of 0 is then feed into D flip-flop 908B. This feedback cycling is continuous.

Therefore, when clock generation circuitry 900 is in 2× mode, every other clock pulse of the output of delay 907B produces a logical 1 output from OR gate 909A, preventing AND gate 910A from allowing the feedback signal to pass through AND gate 910A. Furthermore, in this situation, AND gate 910B prevents the PB signal from passing through it as the CLKOUTA signal every other clock pulse such that the CLKOUT signal goes low. Therefore, both the CLKOUT and CLKIN signals are at half the frequency of the PH1 and PH2 core clock signals because half of the signal pulses are masked. However, even though they are half the frequency, the timing of the signals is exactly the same because the rising and falling edges of the bus clock signals, CLKIN and CLKOUT, are aligned with rising and falling edges of the core clock signals, PH2 and PH1, respectively (and the PUPH2 and PUPH1 clock signals respectively). Thus, in the currently preferred embodiment, the core of the processor (FIG. 2) is allowed to operate at twice the speed of the bus without changing the timing and without additional interface circuitry.

FIG. 10 illustrates timing signals associated with the operation of the clock generation circuitry 900. The use of the divide-by-two master/slave flip-flop (D flip-flops 908A and 908B) and the two AND gates (910A and 910B) provides the pulse-swallower functionality utilized by the present invention to generate the 2× core clock signals. The divide-by-two master/slave flip-flop generates the inhibit signals INH1 and INH2 that act as pulse swallowers for every other CLKOUTA (and, thus, the CLKOUT signal) and CLKIN. In the currently preferred embodiment, this causes the VCO frequency VCOOUT to be 4× that of the input clock frequency (i.e., EFI). Note that in FIG. 10, the CLKOUT and CLKIN signals are quarter duty cycle and have a correct timing relationship with the core clock signals.

Note that the clock signals which are output from delays 907A and 907C are not output directly to the core of the processor. The clock signals are input into control circuitry 930. In the present invention, control circuitry 930 is responsible for powering up and down the processor upon the appropriate internal or external request. In other words, control circuitry 930 is capable of placing the processor in and out of a reduced power consumption state. In the present invention, control circuitry 930 powers down the processor by disabling the PH1 and PH2 core clock signals, thereby preventing the clocking of the core of the processor. Upon receiving the appropriate power up request once in the power down mode, control circuitry 930 powers up the processor. In the currently preferred embodiment, control circuitry 930 powers up the processor by enabling the PH1 and PH2 core clock signals to the core. The powering up and down capability of control circuitry 930 includes the ability to power up the processor to compensate for actions taken by the computer system when the processor is in the power down mode (i.e., the reduced power consumption state). Once the processor performs the necessary actions in response to the actions of the remainder of the computer system, control circuitry 930 returns the processor to the reduced power consumption state.

In the currently preferred embodiment, the PH1 and PH2 core clock signals are disabled in response to either the SRLPD signal or the UNDC signal being asserted. The SRLPD signal is asserted when the processor receives a request to stop operation and power down (i.e., enter a reduced power consumption state). The UNDC signal is asserted when the processor is in the idle state (i.e., the state of no activity), such that the processor can be powered down. In the currently preferred embodiment, both the SRLPD and UNDC signals are active high. In the currently preferred embodiment, the EADSN signal enables the clock signals while in the power down mode, such that the processor is powered up and capable of performing its requisite functions and operations when the EADSN signal is asserted. In the currently preferred embodiment, the EADSN signal is active low.

Assuming the EADSN signal is high (i.e., not asserted), if either the SRLPD signal or the UNDC signal is asserted, then the output of OR gate 931 is high, thereby causing the output of AND gate 932 to be high. When the output of AND gate 932 is high, the EPH2 output of control circuitry 930 is always high. Also if either the SRLPD signal or the UNDC signal is asserted, then the output of inverter 934 is low. The output of inverter 934 being low results in the output of OR gate 936 to be low, thereby causing the output of AND gate to be low. Therefore, in the currently preferred embodiment, when either the SRLPD signal or the UNDC signal are asserted, such that the processor is in the power down mode, the EPH2 and EPH1 inputs to PH1/PH2 circuitry 914 are always high and low respectively, such that the PH2 core clock signal is always high and the PH1 core clock signal is always low. Note also that when the output of OR gate 936 is low, AND gate disables the CLKOUT signal, such that when the CLKOUT signal does not clock the output buffers of the processors when in the power down mode. Note also that even in the power down mode, the PUCOUT signal is still output from clock generator 900, such that the Hold Acknowlegement signal can be output when the processor is in the powerdown mode.

Assuming that either the SRLPD signal or the UNDC signal is asserted and the processor is in the power down mode, if the EADSN signal is asserted, then the output of AND gate 932 is low, thereby causing OR gate 933 to act like a pass gate for the clock signal from delay 907A. In this manner, the EPH2 output from control circuitry 930 is the clock signal from delay 907A. Similarly, if the EADSN signal is asserted, then the output of inverter 935 is high, thereby causing OR gate 936 to output a high. The high output of OR gate 936 causes AND gate 937 to output the state of the clock signal received on its other input from delay 907C. The output of AND gate 937 is then input as the EPH1 input into PH1/PH2 circuitry 914.

Note that if either the SRLPD signal or the UNDC signals is asserted, the PLL of the present invention continues to run and remains in lock during the power down mode. In this manner, the PLL of the present invention is able to power up quickly since the PLL is already in lock. For more information on the use of the SRLPD signal and its generation, see concurrently filed co-pending application Ser. No. 08/036,530, entitled "Method and Apparatus for Powering Down an Integrated Circuit Transparently and its Phase Locked Loop," assigned to the assignee of the present invention. For more information on the use of the UNDC signal and its generation, see concurrently filed co-pending application Ser. No. 08/036,627, entitled "Method and Apparatus for Powering Down a Processor When Idle," assigned to the assignee of the present invention.

PH1/PH2 circuitry 914 is the driver of the PH1 and PH2 core clock signals. The PH1 and PH2 core clock signals are driven in response to the EPH1 and EPH2 input clock signals respectively. The operation of PH1/PH2 circuitry 914 is well-known in the art. Note that in the power down state, the PH1 and PH2 core signals are placed in predetermined states, as discussed above.

PH1/PH2 circuitry 924 is the driver of the PUPH1 and PUPH2 clock signals. The PUPH1 and PUPH2 clock signals are driven directly from the outputs of delays 907C and 907A respectively. In the currently preferred embodiment, these signals are not powered down when the processor receives a stop request or an idle indication. Thus, the PUPH1 and PUPH2 clock signals are not placed in predetermined states when the processor is placed in the reduced power consumption state. The PUPH1 and PUPH2 clock signals clock the operation of the power down control logic of the present invention, such that the microprocessor is responsive to stop clock events when in the reduced power consumption state. Also the PUPH1 and PUPH2 clock signals are used to clock the synchronizers for the inputs during the power down mode. Note that although PH1/PH2 circuitry 924 and PH1/PH2 circuitry 914 have the same circuit structure, in the currently preferred embodiment, PH1/PH2 circuitry 924 is a smaller driver.

Clock generation circuitry 900 also includes EFI stop detect logic 931. EFI stop detect logic 931 detects the stoppage of the external clock signal (i.e., EFI) and disables VCO 905 and divide-by-two 906 once the external clock has been stopped using the STDBY signal.

Dynamic Powerup Cache Invalidation

In the present invention, the processor includes an internal cache. When powered down, other devices in the computer system may be accessing the external memory. If changes are made to data stored in the external memory, the data in the internal cache may be no longer current (i.e., valid). To ensure the data is valid (i.e., to ensure cache coherency), cycles must be performed to keep the internal cache contents consistent with that of the main memory of the computer system. In the present invention, the processor uses a mechanism which detects when other devices in the computer system to the main memory perform write operations to the memory. When a write occurs to a memory address of the main memory whose data is contained in the internal cache, the copy of the data in the cache is invalidated.

In the present invention, two steps are employed to perform the invalidation cycle. First, the external computer system signals the processor to relinquish its address bus. In one embodiment, the processor of the present invention floats the address bus in response to the signal from the external system, so that the address bus may be cleared. Next, the external system asserts the EADSN signal indicating that a valid address is on the address bus of the processor. Activating EADSN causes the processor to read the external address bus and perform an internal cache invalidation. The processor reads the address over its address lines. The external address is checked with the current cache contents. If the address matches any areas of the cache, that area will be invalidated. The cache invalidation mechanism of the present invention operates in a manner well-known in the art.

In the present invention, the EADSN signal is asserted when an external master drives an address onto the bus. The computer system of the present invention includes a direct memory access (DMA) controller which controls access to the main memory. The DMA controller is not shown to avoid obscuring the present invention. In this case, the EADSN signal is usually accompanied closely in time with the signals necessary to cause the processor to float its bus.

As stated above, when the processor is in the low power mode, if a change is made to the external memory by another device in the computer system, then control logic selectively powers the processor, such that an invalidation operation may occur. In one embodiment, whether a change has been made is indicated by a cache invalidation request appearing on the pins of the processor chip. The cache invalidation request inputs are monitored by control logic. In the currently preferred embodiment, the control logic of the present invention selectively powers the processor in response to the EADSN signal.

In the currently preferred embodiment, the control logic that monitors the inputs is in the processor itself, such that control logic in the processor receives inputs while in the power down mode. Note that the input buffers associated with these inputs may be powered in the low power state using either the bus clock signals or the PUPH1 and PUPH2 clock signals.

In the present invention, since the PLL is continuously running in the power down mode (i.e., it is in lock), the control logic of the present invention enables the outputs of the PLL in response to the invalidation inputs. In other words, the control logic enables the core phases, such that the core phases are output to the core of the processor in response to the EADSN signal. By enabling the core phases of the PLL, the core of the processor is able to perform the invalidation cycle.

Once the control logic detects that the invalidation cycle has ended, the core phases of the PLL are once again disabled and the processor returns to the power down mode. The control logic detects the completion of the invalidation cycle by examining the EADSN signal. When the EADSN signal goes inactive, the control logic disables the core phases.

Referring back to FIGS. 9A and 9B, the control logic of the present invention is shown. Specifically, in the currently preferred embodiment, the EADSN signal is active low. When the processor is in a low power mode (as indicated by the SRLDP and UNDC signals being active high), if the EADSN signal is active, the output of AND gate 932 is low (i.e., zero). The output of AND gate 932 being low allows OR gate 933 to pass the state of the clock signal output from delay 907A. In other words, the EADSN signals effectively causes OR gate 933 to allow the clock signal from delay 907A to pass to PH1/PH2 circuitry 914. Similarly, when the processor is in the low power mode, if the EADSN signal is active, the output of OR gate 936 is high, thereby causing AND gate 937 to output the state of the clock signal on its other input. That is, AND gate 937 outputs the clock signal output from delay 907C when the EADSN signal is active. Therefore, when the EADSN signal is active, the EPH1 and EPH2 clock signals are input into the PH1/PH2 driver circuitry 914, such that the PH1 and PH2 core clock phases can be enabled to the core of the processor. Note that the EADSN signal does not influence whether the smaller PH1/PH2 driver circuitry 924 receives the clock signals from delays 907A and 907C.

After the invalidation cycle has been completed, the EADSN signal goes inactive (i.e., high) which causes the output of AND gate 932 to transition high. The output of AND gate 932 being high causes OR gate 933 to output a high, such that the EPH2 input to PH1/PH2 circuitry 914 is always high in the power down mode. Likewise, when the EADSN signal goes inactive, the output of inverted 935 goes low. The output of inverter 935 being low causes the output of OR gate 936 to be low in the power down mode, thereby causing AND gate 937 to output a logical low (i.e., 0). Since the output of AND gate 937 is the EPH1 input to PH1/PH2 circuitry 914, the PH1 output to the core of the processor returns to 0 after the invalidation cycle.

The timing diagram of FIG. 11 illustrates the various clock signal phases and their sequence for a cache invalidation cycle. Referring to FIG. 11, the external frequency clock input (EFI), the I/O clock signal CLKIN, the EADSN signal, and both core clock phases PH2 and PH1 are shown. Up to time t1, the processor is shown operating in the powered up state with the core clock phases PH1 and PH2 running at twice the frequency of the CLKIN signal. At time t1, the processor enters a power down state, either due to the execution of a HALT instruction or the generation of another stop request interrupt. This causes the core clock phases PH2 and PH1 to go to a logical high and low respectively. During this time, the EADSN signal is inactive (i.e., a logical high). At time t2, the EADSN signal is asserted. When the EADSN signal goes low, the core clock phases PH2 and PH1 are enabled, such that they resume normal clocking of the core of the processor. At time t3, when the invalidate cycle ends, the EADSN signal becomes inactive, which causes the core clock signals to return to their normal power down states.

The present invention allows the cache coherency to be maintained between the cache and the external memory of the computer system when the computer system enters the low power mode. In the prior art, if the bus is requested for DMA cycles during the power down mode, the entire cache would have to be invalidated through a flush operation either before entering the mode or immediately upon powering up the processor in order to maintain cache coherency. The present invention maintains the processor cache coherency while in a low power mode by allowing individual cache lines to be invalidated. By maintaining cache coherency, the overall instructions-per-second performance of the processor does not suffer because a full cache flush does not have to be performed to maintain cache coherency upon powering up after the system requested the bus for DMA cycles during the power down mode.

Note that the present invention allows cache coherency to be maintained in the computer system without requiring additional hardware in the computer system. The processor powers up to allow for invalidation cycles in response to the EASDN signal being asserted by the computer system. That is, using existing signals in the system and by routing the EADSN signal to the clock generation unit of the processor, the present invention is able to provide cache coherency for the processor in the powered down state. The present invention does not require changes to be made to the circuit board of the computer. Therefore, a processor which incorporates the present invention may be inserted into existing computer systems, thereby allowing the computer system to be able to maintain cache coherency in the low power state. In this manner, the present invention allows a computer system to be upgraded to enhance its performance without any changes made to the remainder of the computer system.

Note that the power consumption of the processor, and thus the computer system, can be reduced significantly and overall performance can be enhanced due to the elimination of the need for a full cache invalidation to occur when entering a low power mode or exiting the low power state.

Whereas many alterations and modifications of the present invention will no doubt become apparent to a person of ordinary skill in the art after having read the foregoing description, it is to be understood that the particular embodiment shown and described by way of illustration are in no way intended to be considered limiting. Therefore, reference to the details of the preferred embodiments are not intended to limit the scope of the claims which themselves recite only those features regarded as essential to the invention.

Thus, a method and apparatus for invalidating a cache has described.

We claim:

1. An integrated circuit for use in a computer system having an external clock generator for providing a frequency input clock signal, said integrated circuit comprising:

phase locked loop (PLL) circuit means generating at least one clock signal in response to the frequency input clock signal;

processing means for processing data synchronous with said at least one clock signal;

cache memory means coupled to said processing means for storing and providing data and a plurality of instructions to said processing means;

first logic circuit means for placing said integrated circuit in a reduced power consumption state;

second logic circuit means for powering up said integrated circuit out of said reduced power consumption state to run an invalidation cycle in said cache memory means to invalidate data in the cache memory means, wherein said second logic circuit includes means to place said integrated circuit back into the reduced power consumption state after said invalidation cycle has been completed, such that cache coherency is maintained while the integrated circuit operates with reduced power consumption.

2. The integrated circuit as defined in claim 1 wherein said at least one clock signal is a predetermined multiple of the frequency input clock signal.

3. The integrated circuit as defined in claim 1 wherein said PLL generates at least one bus clock signal for clocking the operation on the bus and at least one core clock signal for clocking the operation of the core, and wherein said first logic circuit means places the integrated circuit in the reduced power consumption state by preventing the processing means from receiving said at least one core clock signal.

4. The integrated circuit as defined in claim 1 wherein said PLL remains in lock when in the reduced power consumption state.

5. The integrated circuit as defined in claim 1 wherein said PLL supplies at least one bus clock signal when in the reduced power consumption state. power consumption state.

6. A processor having a core for use in a computer system having a bus and an external clock generator for providing a frequency input clock signal, said processor comprising:

a phase locked loop (PLL) circuit means generating at least one core clock signal for clocking the core in response to said frequency input clock signal;

a central processing unit (CPU) for processing data synchronous with said at least one clock signal;

a cache memory having a plurality of lines, said cache memory coupled to said CPU for storing and providing data and a plurality of instructions to said CPU;

a first logic circuit means for placing said processor in a reduced power consumption state, wherein said first logic circuit means includes a control logic means for disabling said at least one core clock signal to the remainder of the processor when placing said processor in the reduced power consumption state, wherein the PLL continuously runs during the reduced power consumption state;

a second logic circuit means for powering up the processor out of said reduced power consumption state to run an invalidation cycle in said cache memory to invalidate data in the cache memory, wherein said second logic circuit means includes means to place the processor back into the reduced power consumption state after performing the invalidation cycle, such that cache coherency is maintained while the processor operates with reduced power consumption.

7. The processor as defined in claim 6 wherein said at least one clock signal is a predetermined multiple of the frequency input clock signal.

8. The processor as defined in claim 6 wherein said second logic circuit performs the invalidation cycle in response to an external signal.

9. A computer system comprising:

bus means for communicating data in the computer system;

phase locked loop (PLL) circuit means for generating at least one bus clock signal for clocking bus operations and at least one core clock signal;

processing means coupled to said bus for processing data synchronous to said at least one core clock signal and transferring data externally according to said at least one bus clock signal, wherein said processing means includes a cache memory means for storing information, and further wherein the processing means is capable of being in a reduced power consumption state;

memory means coupled to said bus for storing information;

peripheral means coupled to said bus for performing a designated function, wherein said peripheral means accesses said memory means, such that data is written into said memory means;

means coupled to said bus and the PLL circuit means for monitoring when said peripheral means accesses said main memory, wherein the means for monitoring includes means for generating a signal indicating that the peripheral means has accessed the main memory;

wherein said processing means powers up from the reduced power consumption state in response to the signal being asserted wherein an invalidation cycle occurs on said cache memory means to invalidate data in the cache memory means, and wherein the processing means re-enters the reduced power consumption state after the invalidation cycle, such that cache coherency is maintained while the processing means operates with reduced power consumption.

10. The computer system as defined in claim 9 wherein said means for placing said processing means in the reduced power consumption state includes means for freezing said at least one core clock signal in either a first or second predetermined logic state, such that the PLL is continuously running during the reduced power consumption state.

11. The computer system as defined in claim 9 wherein said at least one core clock signal is a predetermined multiple of the frequency input clock signal.

12. The computer system as defined in claim 11 wherein said at least one bus clock signal is at the same frequency as the frequency input clock signal.

13. A clock generation circuitry for use on a processor having a core and coupled to a bus in a computer system, wherein the core includes a cache memory, said processor receiving a frequency input clock signal, said clock generation circuitry comprising:

a phase locked loop (PLL) circuit that generates at least one bus clock signal for clocking bus operations and at least one core clock signal for clocking the core in response to said frequency input clock signal;

circuit means for enabling and disabling said at least one core clock signal, wherein said circuit means disables said at least one core clock signal when placing said processor in the reduced power consumption state, such that the PLL and said at least one bus clock signal are continuously running during the reduced power consumption state and the PLL remains in lock, and wherein said circuit means enables said at least one core clock signal to power up said processor out of said reduced power consumption state to perform an invalidation cycle on said cache memory to invalidate data in the cache memory, wherein said circuit means disables said at least one core clock signal from the core to place the processor back into the reduced power consumption state after performing the invalidation cycle, such that cache coherency is maintained while the processor operates with reduced power consumption.

14. The circuit defined by claim 13 wherein said phased lock loop includes:

a phase detector means for receiving said frequency input clock signal and a feedback signal and for generating a first signal in response thereto that is a measure of the phase difference between said frequency input clock signal and said feedback signal;

a voltage generation means for generating a voltage control signal in accordance with said first signal;

a voltage-controlled oscillator means for generating said at least one core clock signal in response to said voltage control signal, the frequency of said at least one core clock signal varying in accordance with the level of said feedback voltage; and a frequency divider means for generating said feedback signal in response to said at least one core clock signal, said feedback signal having a frequency which is a multiple of said at least one core clock signal, such that said oscillator produces a signal which is N times the frequency of said frequency input clock signal.

15. The circuit defined by claim 14 wherein said frequency divider comprises:

first logic means for generating a masking signal in response to said at least one core clock signal, said masking signal being a first state or a second state; and second logic means for generating said feedback signal in response to said at least one core clock signal and said masking signal, such that said second logic means generates said feedback signal when said masking signal is in said first state and masks said feedback signal when said masking signal is in said second state.

16. The circuit defined by claim 13 wherein said frequency divider generates said bus clock signals.

17. In a processor clocked by a frequency input clock signal, a circuit for allowing a core of said processor to invalidate data in an internal cache memory, said circuit comprising:

a phase detector means for receiving said frequency input clock signal and a feedback signal and for generating a first signal in response thereto that is a measure of the phase difference between said frequency input clock signal and said feedback signal;

a voltage generation means for generating a voltage control signal in accordance with said first signal;

a voltage-controlled oscillator means for generating at least one core clock signal in response to said voltage control signal, the frequency of said at least one core clock signal varying in accordance with the level of said feedback voltage;

first logic means for generating a masking signal in response to said at least one core clock signal, said masking signal being a first state or a second state; and second logic means for generating at least one bus clock signal in response to said at least one core clock signal and said masking signal, such that said second logic means generates said at least one bus clock signal when said masking signal is in said first state and masks said at least one bus clock signal when said masking signal is in said second state, such that said at least one bus control signal has a frequency which is a multiple of said at least one core clock signal, one of said at least one bus clock signal being said feedback signal, such that said at least one core clock signal is a predetermined multiple of the frequency of said frequency input clock signal, circuit means for enabling and disabling said at least one core clock signal, wherein said circuit means disables said at least one core clock signal when placing said processor in the reduced power consumption state, such that the PLL and said at least one bus clock signal are continuously running during the reduced power consumption state, and wherein said circuit means enables said at least one core clock signal to power up said processor out of said reduced power consumption state to perform an invalidation cycle on said cache memory to invalidate data in the cache memory, wherein said circuit means disables said at least one core clock signal to place the processor back into the reduced power consumption state after performing the invalidation cycle, such that cache coherency is maintained while the processor operates with reduced power consumption.

18. A method for maintaining cache coherency between a cache memory in a processor and a memory in a computer system, the processor having a core, the method comprising:

placing the processor in a reduced power consumption state, wherein said processor is clocked by a phase locked loop that generates at least one core clock signal for clocking the core of the processor, and wherein the processor is placed in the reduced power consumption state by preventing said at least one core clock signal from clocking the core;

monitoring invalidation inputs to determine when a cache invalidation is required;

exiting the reduced power consumption state to perform a cache invalidation cycle to invalidate data in the cache memory; and re-entering the reduced power consumption state after performing the cache invalidation cycle, such that cache coherency is maintained while the processor operates with reduced power consumption.

19. The method as defined in claim 18 wherein the step of placing the processor in the reduced power consumption state comprises the steps of:

freezing said at least one core clock signal in either a high or low state; and maintaining the PLL in lock and continuously generating said at least one bus clock signal.

20. The method as defined in claim 19 wherein the step of exiting the reduced power consumption state to perform a cache invalidation cycle comprises the steps of:

powering up the processor from the reduced power consumption state;

the processor floating an address bus so that an external device can drive an address on the address bus, wherein the processor drivers addresses the address bus at other times; and the processor monitoring the address bus to perform a cache invalidation cycle to invalidate data in the cache memory at the address driven by the external device.

21. An integrated circuit comprising:

a cache memory for storing data duplicated in a main memory;

a first logic circuit placing said integrated circuit in a reduced power consumption state; and a second logic circuit temporarily powering up said integrated circuit out of said reduced power consumption state to run an invalidation cycle in said cache memory for maintaining cache coherence with the main memory, the second logic circuit restoring the integrated circuit to the reduced power consumption state after running the invalidation cycle.

22. The integrated circuit as defined in claim 21 further comprising:

a phase lock loop (PLL) circuit providing at least one clock signal, said PLL remaining in lock while the integrated circuit enters and leaves said reduced power consumption state.

23. In a computer system including a processor, a memory system, a bus master, and an address bus, the processor having a normal power consumption state and a reduced power consumption state, the reduced power consumption state using less power than the normal power consumption state, a method for maintaining cache coherency between a cache memory in the processor and the memory system of the computer system, the method comprising:

placing the processor in the reduced power consumption state from the normal power consumption state;

monitoring accesses to the memory system to determine when a cache invalidation is required, and upon determining that a cache invalidation is required, placing the processor in the normal power consumption state from the reduced power consumption state, the processor floating the address bus so that the bus master can drive an address on the address bus, the processor monitoring the address bus to perform a cache invalidation cycle to invalidate data in the cache memory at the address driven by the bus master, and returning the processor to the reduced power consumption state from the normal power consumption state, such that cache coherency is maintained between the cache memory and the memory system.

24. The method of claim 23 wherein the processor is clocked by a phase locked loop, and the step of placing the processor in the reduced power consumption state is performed by preventing the phase locked loop from clocking a core of the processor while the phase locked loop remains in lock.

* * * * *

UNITED STATES PATENT AND TRADEMARK OFFICE
CERTIFICATE OF CORRECTION

PATENT NO.   : 5,481,731
DATED        : January 2, 1996
INVENTOR(S)  : Conary et al.

It is certified that error appears in the above-identified patent and that said Letters Patent is hereby corrected as shown below:

In column 14 at line 49 delete "9241." and insert --9241.--

In column 15 at line 31 delete "VCO 005" and insert --VCO 905--

Signed and Sealed this

Twenty-fourth Day of June, 1997

Attest:

Attesting Officer

BRUCE LEHMAN

Commissioner of Patents and Trademarks